United States Patent
Bitenc et al.

(10) Patent No.: US 12,467,096 B2
(45) Date of Patent: Nov. 11, 2025

(54) METHODS AND SYSTEMS FOR IDENTIFYING METHYLATION BIOMARKERS

(71) Applicant: Universal Diagnostics, S.A., Seville (ES)

(72) Inventors: Marko Bitenc, Ljubljana (SI); Kristi Kruusmaa, Ljubljana (SI); Juan Martinez-Barea, Seville (ES); Christian Hense, Seville (ES); Pol Sola de los Santos, Seville (ES); Pol Canal Noguer, Seville (ES); Marko Chersicola, Ljubljana (SI); Primož Knap, Ljubljana (SI)

(73) Assignee: Universal Diagnostics, S.A., Seville (ES)

( * ) Notice: Subject to any disclaimer, the term of this patent is extended or adjusted under 35 U.S.C. 154(b) by 291 days.

(21) Appl. No.: 17/027,148

(22) Filed: Sep. 21, 2020

(65) Prior Publication Data

US 2021/0355542 A1 Nov. 18, 2021

Related U.S. Application Data

(60) Provisional application No. 63/025,855, filed on May 15, 2020.

(51) Int. Cl.
*C12Q 1/6886* (2018.01)
*C12Q 1/6869* (2018.01)
*G16B 20/00* (2019.01)
*G16H 50/20* (2018.01)

(52) U.S. Cl.
CPC ......... *C12Q 1/6886* (2013.01); *C12Q 1/6869* (2013.01); *G16B 20/00* (2019.02); *G16H 50/20* (2018.01); *C12Q 2600/154* (2013.01)

(58) Field of Classification Search
CPC .............. C12Q 1/6886; C12Q 1/6869; C12Q 2600/154; G16H 50/20; G16B 20/00
See application file for complete search history.

(56) References Cited

U.S. PATENT DOCUMENTS

| | | |
|---|---|---|
| 6,265,171 B1 | 7/2001 | Herman et al. |
| 6,605,432 B1 | 8/2003 | Huang |
| 6,812,339 B1 | 11/2004 | Venter et al. |
| 7,144,701 B2 | 12/2006 | Huang |
| 7,745,391 B2 | 6/2010 | Mintz et al. |
| 7,807,358 B1 | 10/2010 | Huang |
| 8,048,634 B2 | 11/2011 | Lai |
| 9,745,622 B2 | 8/2017 | An et al. |
| 9,850,523 B1 | 12/2017 | Chudova et al. |
| 10,006,925 B2 | 6/2018 | Bitenc et al. |
| 10,301,680 B2 | 5/2019 | Ahlquist et al. |
| 10,392,666 B2 | 8/2019 | Lo et al. |
| 10,428,388 B2 | 10/2019 | An et al. |
| 11,001,898 B2 | 5/2021 | Bitenc et al. |
| 11,118,228 B2 | 9/2021 | Allawi et al. |
| 11,345,967 B2 | 5/2022 | Morris |
| 11,396,679 B2 | 7/2022 | Bitenc et al. |
| 11,530,453 B2 | 12/2022 | Bitenc et al. |
| 11,728,007 B2 | 8/2023 | Ghosh |
| 11,773,453 B2 | 10/2023 | Talasaz |
| 11,827,942 B2 | 11/2023 | Mortimer et al. |
| 11,869,661 B2 | 1/2024 | Maher |
| 11,879,158 B2 | 1/2024 | Talasaz |
| 11,929,148 B2 | 3/2024 | Filippova et al. |
| 2007/0237813 A1 | 10/2007 | Misawa et al. |
| 2007/0298506 A1 | 12/2007 | Ordway et al. |
| 2010/0167940 A1 | 7/2010 | Feinberg |
| 2010/0240549 A1 | 9/2010 | Brown |
| 2010/0298158 A1 | 11/2010 | DePinho et al. |
| 2011/0318738 A1 | 12/2011 | Jones et al. |
| 2012/0289581 A1 | 11/2012 | Chang et al. |
| 2013/0012410 A1 | 1/2013 | Zou et al. |
| 2013/0085681 A1 | 4/2013 | Deciu et al. |
| 2013/0189684 A1 | 7/2013 | Ehrich et al. |
| 2013/0288247 A1 | 10/2013 | Mori et al. |
| 2014/0128283 A1 | 5/2014 | Feinberg et al. |

(Continued)

FOREIGN PATENT DOCUMENTS

| | | |
|---|---|---|
| EP | 2481813 A1 | 8/2012 |
| EP | 2497834 A2 | 9/2012 |

(Continued)

OTHER PUBLICATIONS

Joubert et al. "DNA methylation in Newborns and Maternal Smoking in Pregnancy: Genome-wide Consortium Meta-analysis." The American Journal of Human Genetics. 2016. vol. 98, pp. 680-696. (Year: 2016).*
Wan et al. "Identification of Smoking-Associated Differentially Methylated Regions Using Reduced Representation Bisulfite Sequencing and Cell type-Specific Enhancer Activation and Gene Expression." Environmental Health Perspectives. 2018. vol. 126(4), pp. 047015-1 to 047015-18. (Year: 2018).*
Smeers et al. "Evaluation of three statistical prediction models for forensic age prediction based on DNA methylation." Forensic Science International: Genetics. 2018. vol. 34, pp. 128-133. (Year: 2018).*
Verbanck et al. "Detection of widespread horizontal pleiotropy in causal relationships inferred from Mendelian randomization between complex traits and diseases." Nature Genetics. 2018. vol. 50, pp. 693-698. (Year: 2018).*

(Continued)

*Primary Examiner* — Kaitlyn L Minchella
*Assistant Examiner* — Steven W. Bailey
(74) *Attorney, Agent, or Firm* — Choate, Hall & Stewart LLP; William R. Haulbrook; Samuel R. Polio

(57) ABSTRACT

Described herein are various systems, methods, and apparatus for identifying biomarkers for detection of a disease or condition such as advanced adenoma, colorectal cancer, or other cancers. In certain embodiments, the present invention relates to methods and/or systems for identifying one or more biomarkers related to methylation status in cell-free deoxyribonucleic acid (DNA) of a human subject and/or detecting (e.g., screening for) cancer based on one or more known biomarkers (e.g., the identified biomarkers).

11 Claims, 10 Drawing Sheets

(56) References Cited

U.S. PATENT DOCUMENTS

| | | |
|---|---|---|
| 2015/0011403 A1 | 1/2015 | Lo et al. |
| 2015/0072866 A1 | 3/2015 | Weisburg et al. |
| 2015/0152505 A1 | 6/2015 | Lapointe et al. |
| 2016/0333416 A1 | 11/2016 | Babiarz et al. |
| 2016/0355885 A1 | 12/2016 | Weinhausel et al. |
| 2017/0016048 A1 | 1/2017 | Blauwkamp et al. |
| 2017/0101674 A1 | 4/2017 | So et al. |
| 2017/0335401 A1 | 11/2017 | Allawi et al. |
| 2017/0356051 A1 | 12/2017 | Ishioka et al. |
| 2017/0369948 A1 | 12/2017 | Markowitz et al. |
| 2018/0051338 A1 | 2/2018 | West et al. |
| 2018/0119137 A1 | 5/2018 | Matsuguchi et al. |
| 2018/0148777 A1 | 5/2018 | Kirkizlar et al. |
| 2018/0245157 A1 | 8/2018 | Allawi et al. |
| 2018/0251859 A1 | 9/2018 | Ahlquist et al. |
| 2018/0258498 A1 | 9/2018 | Ahlquist et al. |
| 2018/0305765 A1 | 10/2018 | Feber et al. |
| 2018/0363063 A1 | 12/2018 | Guerrero-Preston et al. |
| 2019/0025308 A1 | 1/2019 | Cummings et al. |
| 2019/0032149 A1 | 1/2019 | Van Engeland et al. |
| 2019/0085406 A1 | 3/2019 | Mortimer et al. |
| 2019/0112645 A1 | 4/2019 | Woodhouse et al. |
| 2019/0161805 A1 | 5/2019 | Ahlquist et al. |
| 2019/0256921 A1 | 8/2019 | Mueller et al. |
| 2019/0256924 A1 | 8/2019 | Vogelstein et al. |
| 2019/0352721 A1 | 11/2019 | Kusunoki et al. |
| 2020/0017916 A1 | 1/2020 | Ren |
| 2020/0157640 A1 | 5/2020 | Letourneur et al. |
| 2020/0340062 A1 | 10/2020 | Salhia |
| 2020/0377954 A1 | 12/2020 | Bitenc et al. |
| 2020/0377959 A1 | 12/2020 | Bitenc et al. |
| 2021/0139948 A1 | 5/2021 | Bitenc et al. |
| 2021/0230707 A1 | 7/2021 | Bitenc et al. |
| 2021/0277487 A1 | 9/2021 | Bitenc et al. |
| 2021/0324477 A1 | 10/2021 | Xiang et al. |
| 2021/0332440 A1 | 10/2021 | Kruusmaa et al. |
| 2021/0404010 A1 | 12/2021 | Bitenc et al. |
| 2021/0404011 A1 | 12/2021 | Bitenc et al. |
| 2022/0106644 A1 | 4/2022 | Taylor et al. |
| 2022/0136058 A1 | 5/2022 | Allawi et al. |
| 2022/0186323 A1 | 6/2022 | Mortimer et al. |
| 2022/0228221 A1 | 7/2022 | Curtis |
| 2022/0389521 A1 | 12/2022 | Bitenc et al. |
| 2022/0403471 A1 | 12/2022 | Morris et al. |
| 2022/0403473 A1 | 12/2022 | Lewin et al. |
| 2022/0411878 A1 | 12/2022 | Kruusmaa |
| 2023/0028856 A1 | 1/2023 | Ahlquist et al. |
| 2023/0090925 A1 | 3/2023 | Liu |
| 2023/0175058 A1 | 6/2023 | Delubac et al. |
| 2023/0178181 A1 | 6/2023 | Mahajan et al. |
| 2023/0193395 A1 | 6/2023 | Liu et al. |
| 2023/0203473 A1 | 6/2023 | Diniz De Carvalho et al. |
| 2023/0220492 A1 | 7/2023 | St. John et al. |
| 2023/0242995 A1 | 8/2023 | Van Engeland et al. |
| 2023/0323446 A1 | 10/2023 | Ariazi et al. |
| 2024/0060143 A1 | 2/2024 | Yip et al. |
| 2024/0084397 A1 | 3/2024 | Mahajan et al. |

FOREIGN PATENT DOCUMENTS

| | | |
|---|---|---|
| EP | 2886659 A1 | 6/2015 |
| EP | 2899275 A1 | 7/2015 |
| EP | 2977467 A2 | 1/2016 |
| WO | WO-02/081749 A2 | 10/2002 |
| WO | WO-2005/001142 A2 | 1/2005 |
| WO | WO-2007/149269 A2 | 12/2007 |
| WO | WO-2010/118559 A1 | 10/2010 |
| WO | WO-2012/034170 A1 | 3/2012 |
| WO | WO-2012/047899 A2 | 4/2012 |
| WO | WO-2012/104642 A1 | 8/2012 |
| WO | WO-2012/154979 A2 | 11/2012 |
| WO | WO-2012/167145 A2 | 12/2012 |
| WO | WO-2012/170715 A1 | 12/2012 |
| WO | WO-2013/057581 A2 | 4/2013 |
| WO | WO-2013/097868 A1 | 7/2013 |
| WO | WO-2014/032227 A1 | 3/2014 |
| WO | WO-2014/062218 A1 | 4/2014 |
| WO | WO-2015/116837 A1 | 8/2015 |
| WO | WO-2015/153283 A1 | 10/2015 |
| WO | WO-2015/153284 A1 | 10/2015 |
| WO | WO-2015/159292 A2 | 10/2015 |
| WO | WO-2016/060278 A1 | 4/2016 |
| WO | WO-2016/109782 A2 | 7/2016 |
| WO | WO-2017/012592 A1 | 1/2017 |
| WO | WO-2017/043497 A1 | 3/2017 |
| WO | WO-2017/048932 A1 | 3/2017 |
| WO | WO-2017/192221 A1 | 11/2017 |
| WO | WO-2017/201606 A1 | 11/2017 |
| WO | WO-2017/212428 A1 | 12/2017 |
| WO | WO-2018/087129 A1 | 5/2018 |
| WO | WO-2018/119452 A2 | 6/2018 |
| WO | WO-2018/140781 A1 | 8/2018 |
| WO | WO-2018/195211 A1 | 10/2018 |
| WO | WO-2018/209361 A2 | 11/2018 |
| WO | WO-2019/068082 A1 | 4/2019 |
| WO | WO-2019/175876 A2 | 9/2019 |
| WO | WO-2020/069350 A1 | 4/2020 |
| WO | WO-2020/232109 A1 | 11/2020 |
| WO | WO-2020/239895 A2 | 12/2020 |
| WO | WO-2020/239896 A1 | 12/2020 |
| WO | WO-2021/016441 A1 | 1/2021 |
| WO | WO-2021/041726 A1 | 3/2021 |
| WO | WO-2021/094017 A1 | 5/2021 |
| WO | WO-2021/216477 A1 | 10/2021 |
| WO | WO-2021/228418 A1 | 11/2021 |
| WO | WO-2022/003572 A1 | 1/2022 |
| WO | WO-2023/023123 A1 | 2/2023 |
| WO | WO-2023/083308 A1 | 5/2023 |

OTHER PUBLICATIONS

Stuart et al. "Contrasting effects of environment and genetics generate a continuum of parallel evolution." Nature Ecology & Evolution. 2017. vol. 1(0158), pp. 1-7. (Year: 2017).*

Vidaki et al. "DNA methylation-based forensic age prediction using artificial neural networks and next generation sequencing." Forensic Science International: Genetics. vol. 28, pp. 225-236. (Year: 2017).*

Hazra et al. "Biostatistics Series Module 6: Correlation and Linear Regression." Indian Journal of Dermatology. 2016. vol. 61, pp. 593-601. (Year: 2016).*

Vidal et al. "A DNA methylation map of human cancer at single base-pair resolution." Oncogene, vol. 36, pp. 5648-5657. (Year: 2017).*

Nawi et al. "Tissue and Serum Trace Elements Concentration among Colorectal Patients: A Systematic Review of Case-Control Studies." Iranian Journal of Public Health, vol. 48, No. 4, pp. 632-643. (Year: 2019).*

Pesapane et al. "Will traditional biopsy be substituted by radiomics and liquid biopsy for breast cancer diagnosis and characterization?" Medical Oncology, (Online Mar. 16), vol. 37:29, pp. 1-18. (Year: 2020).*

Korthauer et al. "Detection and accurate false discovery rate control of differentially methylated regions from whole genome bisulfite sequencing." Biostatistics, vol. 20, No. 3, pp. 367-383. (Year: 2019).*

Exner, R. et al., Potential of DNA methylation in rectal cancer as diagnostic and prognostic biomarkers, Br. J. Cancer, 113(7):1035-1045 (2015).

Genecards, ALKAL1 Gene—ALK and LTK Ligand 1, 18 pages, (2022).

Petko, Z. et al., Aberrantly methylated CDKN2A, MGMT, and MLH1 in colon polyps and in fecal DNA from patients with colorectal polyps, Clin. Cancer Res., 11(3):1203-1209 (2005).

Pulverer, W. et al., The stem cell signature of CHH/CHG methylation is not present in 271 cancer associated 5'UTR gene regions, Biochimie, 94(11):2345-2352 (2012).

UCSC Genome Browser 1, CpG Island Info, Band 9p21.3, 2 pages, (2020).

UCSC Genome Browser 2, CpG Island Info, Band 8q11.23, 2 pages, (2020).

(56) References Cited

OTHER PUBLICATIONS

Blesa, J. R. et al., NRF-1 is the major transcription factor regulating the expression of the human TOMM34 gene, Biochemistry and Cell Biology, Biochem Cell Biol., 86(1):46-56, (2008).
International Search Report, International Application No. PCT/EP2020/076221, filed Sep. 21, 2020, 4 pages, (mailed Feb. 11, 2021).
Liu, W-B et al., TMEM196 acts as a novel functional tumour suppressor inactivated by DNA methylation and is a potential prognostic biomarker in lung cancer, Oncotarget, 6(25):21225-21239, (2015).
Margolin, G. et al., Robust Detection of DNA Hypermethylation of ZNF154 as a Pan-Cancer Locus with in Silico Modeling for Blood-Based Diagnostic Development, The Journal of Molecular Diagnostics, 18(2):283-298, (2016).
Mitchell, S. M. et al., A panel of genes methylated with high frequency in colorectal cancer, BMC Cancer, Biomed Central, London, GB, 14(1):54, 15 pages, (2014).
Written Opinion, International Application No. PCT/EP2020/076221, filed Sep. 21, 2020, 11 pages, (mailed Feb. 11, 2021).
Zhou, X. et al., Identification of epigenetic modulators in human breast cancer by integrated analysis of DNA methylation and RNA-Seq data, Epigenetics, 13(5):473-489, (2018).
Chen, J. et. al., DNA methylation biomakers in stool for early screening of colorectal cancer, Journal of Cancer,10(21):5264-5271, (2019).
Chen, J.J., et. al., DNA methylation assay for colorectal carcinoma, Cancer Biology & Medicine, 14(1):42-49, (2017).
Lam, K. et al., DNA methylation based biomakers in colorectal cancer: A systematic review, Elsevier Science BV, Biochimica et Biophysica Acta 1866:106-1202 (2016).
Li, H. et. al., Identification of novel DNA methylation markers in colorectal cancer using MIRA-based microarrays, Oncology Reports, National Hellenic Research Foundation, 28(1):99-104, (2012).
Mitchell, S.M. et. al., A panel of genes methylated with high frequency in colorectal cancer, BMC cancer biomed central, 14(1): 54, (2014).
Adalsteinsson, V.A. et al., Scalable whole-exome sequencing of cell-free DNA reveals high concordance with metastatic tumors, Nat. Commun., 8(1):1324, (2017).
Adusumalli, S. et al., Methodological aspects of whole-genome bisulfite sequencing analysis, Briefings in Bioinformatics, 16(3):369-379, (2014).
Bacolod, M. D. et al., Application of Multiplex Bisulfite PCR-Ligase Detection Reaction-Real-Time Quantitative PCR Assay in Interrogating Bioinformatically Identified, Blood-Based Methylation Markers for Colorectal Cancer, The Journal of Molecular Diagnostics, 22(7):886-900, (2020).
Heidary, M. et al., The dynamic range of circulating tumor DNA in metastatic breast cancer, Breast Cancer Res., 16(4):421, (2014).
Kirkizlar, E. et al., Detection of Clonal and Subclonal Copy-Number Variants in Cell-Free DNA from Patients with Breast Cancer Using a Massively Multiplexed PCR Methodology, Transl. Oncol., 8(5):407-416, (2015).
Kukita, Y. et al., High-fidelity target sequencing of individual molecules identified using barcode sequences: de novo detection and absolute quantitation of mutations in plasma cell-free DNA from cancer patients, DNA Res., 22(4):269-277, (2015).
Leary, R.J. et al., Detection of chromosomal alterations in the circulation of cancer patients with whole-genome sequencing, Sci. Transl. Med., 4(162):162ra154, (2012).
Lianidou, E., Detection and relevance of epigenetic markers on ctDNA: recent advances and future outlook, Mol. Oncol., 15(6):1683-1700, (2021).
Michels, K.B., The promises and challenges of epigenetic epidemiology, Exp. Gerontol., 45(4):297-301, (2010).
Perakis, S. et al., Advances in Circulating Tumor DNA Analysis, Adv. Clin. Chem., 80:73-153, (2017).
Zhang, S. et al., CRISPR/Cas9-mediated knockout of NSD1 suppresses the hepatocellular carcinoma development via the NSD1/H3/Wnt10b signaling pathway, Journal of Experimental and Clinical Cancer Research, 38(1):467, (2019).
Aberle, D.R., et al., Reduced lung-cancer mortality with low-dose computed tomographic screening, National Lung Screening Trial Research Team, 365(5):395-409, (2011).
Adler, A. et al., Improving compliance to colorectal cancer screening using blood and stool based tests in patients refusing screening colonoscopy in Germany, BMC Gastroenterology, 14:183, (2014).
Andersson, I., et al., Mammographic screening and mortality from breast cancer: the Malmö mammographic screening trial, 297(6654): 943-8, (1988).
Beikircher, G. et al., Multiplexed and Sensitive DNA Methylation Testing Using Methylation-Sensitive Restriction Enzymes "MSRE-qPCR", DNA Methylation Protocols, Methods in Molecular Biology 1708:Ch21:407-424, (2018).
Bray, F. et al., Global Cancer Statistics 2018: GLOBOCAN Estimates of Incidence and Mortality Worldwide for 36 Cancers in 185 Countries, CA Cancer J Clin., 68:394-424, (2018).
Breast Cancer Screening (PDQ®)-Health Professional Version, <https://www.cancer.gov/types/breast/hp/breast-screening-pdq#section/all>. Retrieved on Jul. 17, 2020.
Calderwood, A. H. et al., Colon adenoma features and their impact on risk of future advanced adenomas and colorectal cancer, World Journal of Gastrointestinal Oncology, 8(12):826-834, (2016).
Capman, M. et al., MethyLight and Digital MethyLight, DNA Methylation Protocols, Methods in Molecular Biology, 1708:CH25:497-513, (2018).
Chang, C. P.-Y. et al., Elevated cell-free serum DNA detected in patients with myocardial infarction, Clinica Chimica Acta 327:95-101, (2003).
Chen, Y. et al., Tissue-independent and tissue-specific patterns of DNA methylation alteration in cancer, Epigenetics & Chromatin, 9:10, (2016).
Chiu, R. W. K. et al., Noninvasive prenatal diagnosis of fetal chromosomal aneuploidy by massively parallel genomic sequencing of DNA in maternal plasma, PNAS, 105(51):20458-20463, (2008).
Demissie, K., et al., Empirical comparison of the results of randomized controlled trials and case-control studies in evaluating the effectiveness of screening mammography, 51(2):81-91, (1998).
DOE Joint Genome Institute (AC012313; Mar. 2003), (2003).
DOE Joint Genome Institute (AC024563; Jul. 2002), (2002).
Esteller, M., CpG island hypermethylation and tumor suppressor genes: a booming present, a brighter future, Oncogene, 21:5427-5440, (2002).
Fackler, M. J. and Sukumar, S., Quantitation of DNA Methylation by Quantitative Multiplex Methylation-Specific PCR (QM-MSP) Assay, DNA Methylation Protocols, Methods in Molecular Biology, 1708:CH24:473-496, (2018).
Fan, C.H. et al., Noninvasive diagnosis of fetal aneuploidy by shotgun sequencing DNA from maternal blood, Proceedings of The National Academy of Sciences, 105(42):16266-16271 (2008).
Frommer, M. et al., A genomic sequencing protocol that yields a positive display of 5-methylcytosine residues in individual DNA strands, Proc. Natl. Acad. Sci. USA, 89:1827-1831, (1992).
Galanopoulos, M., et al., Abnormal DNA methylation as a cell-free circulating DNA biomarker for colorectal cancer detection: A review of literature, World Journal of Gastrointestinal Oncology, 9(4):142-152, (2017).
Galeazzi, M. et al., Dosage and characterization of circulating DNA: present usage and possible applications in systemic autoimmune disorders, Autoimmunity Reviews, 2:50-55, (2003).
Gasc, C. et al., Survey and Summary: Sequence capture by hybridization to explore modern and ancient genomic diversity in model and nonmodel organisms, Nucleic Acids Research, 44(10):4504-4518, (2016).
Gonzalgo, M. L. and Liang, G., Methylation-sensitive single-nucleotide primer extension (Ms-SNuPE) for quantitative measurement of DNA methylation, Nature Protocols, 2(8):1931-1936, (2007).
Hemmasi, G., et al., Prevalence of colorectal adenoma in an average-risk population aged 40-50 versus 50-60 years, European Journal of Cancer Prevention (ECP), pp. 1-5, (2014).

(56) References Cited

OTHER PUBLICATIONS

Herman, J. G. et al., Methylation-specific PCR: A novel PCR assay for methylation status of CpG islands, Proc. Natl. Acad. Sci. USA, 93:9821-9826, (1996).
Hussmann, D. and Hansen, L. L., Methylation-Sensitive High Resolution Melting (MS-HRM), DNA Methylation Protocols, Methods in Molecular Biology, 1708:CH28:551-571, (2018).
Imperiale, T. F. et al., Multitarget Stool DNA Testing for Colorectal-Cancer Screening, Correspondence to the Editor, The New England Journal of Medicine, doi:10.1056/NEJMc1405215, 371(2):184-188, (2014).
Imperiale, T. F. et al., Multitarget Stool DNA Testing for Colorectal-Cancer Screening, The New England Journal of Medicine, 370(14):1287-1297, (2014).
Ivanov, M. et al., In-solution hybrid capture of bisulfite-converted DNA for targeted bisulfite sequencing of 174 ADME genes, Nucleic Acids Research, 46(6):e72, 9 pages, (2013).
Karsenti, D. et al., Adenoma and advanced neoplasia detection rates increase from 45 years of age, World Journal of Gastroenterology, 25(4): 447-456 (2019).
Kok-Sin, T., et. al., Identification of diagnostic markers in colorectal cancer via integrative epigenomics and genomics data, Oncology Reports, 34:22-32, (2015).
Kordowski., F., et al., Aberrant DNA methylation of ADAMTS16 in colorectal and other epithelial cancers, BMC Cancer, 18(1):4, (2018).
Krueger, F. and Andrews, S.R., Bismark: a flexible aligner and methylation caller for Bisulfite-Seq applications, Bioinformatics, 27(11):1571-2, (2011).
Kruusmaa, K. et. al., MSRE-qPCR for analysis of gene specific methylation can be accurately used for detection and validation of colorectal cancer-specific patterns, 4Bio Summit (Jan. 1, 2018). <www.universaldx.com/wp-content/uploads/2017/05/4Bio-poster-November-2018.pdf>. Retrieved on Aug. 19, 2020.
Kutsenko, A., et. al., NotI flanking sequences: a tool for gene discovery and verification of the human genome, Nucleic Acids Research, 30(14):3163-3170, (2002).
Laird, P. W., Applications of Next-Generation Sequencing: Principles and challenges of genomewide DNA methylation analysis, Nature Review, Genetics, 11:191-203, (2010).
Leon, S. A et al., Free DNA in the Serum of Cancer Patients and the Effect of Therapy, Cancer Research, 37:646-650, (1977).
Liles, E. G et al., Uptake of a colorectal cancer screening blood test is higher than of a fecal test offered in clinic: A randomized trial, Cancer Treatment and Research Communications, 10:27-31, (2017).
Liu, Y. et al., Methylation-sensitive enrichment of minor DNA alleles using a double-strand DNA-specific nuclease, Nucleic Acids Research, 45(6):e39, 11 pages, (2017).
Lowe, T., et. al., A Computer program for selection of oligonucleotide primers for polymerase chain reactions, Nucleic Acids Research. 18(7):1757-1761, (1990).
Masser, D. R. et al., Targeted DNA Methylation Analysis by Next-generation Sequencing, Journal of Visualized Experiments, www.jove.com, © Creative Commons Attribution-NonCommercial License, 96:e52488, 11 pages, (2015).
Melnikov, A. A., et. al., MSRE-PCR for analysis of gene-specific DNA methylation, Nucleic Acids Research, 33(10): e93-e93, (2015).
Meyer, D. et al., Package 'e1071', Misc Functions of the Department of Statistics, Probability Theory Group (Formerly: E1071), Tu Wien, HTTPS://cran.r-project.org/web/packages/e1071/index.html, 63 pages, (2019).

Nakamura, A. et al., Relationship between sodium excretion and pioglitazone-induced edema, Journal of Diabetes Investigation, 1(5):208-211, (2010).
Navarro, M. et al., Colorectal cancer population screening programs worldwide in 2016: An Update, World J Gastroenterol, 23(20):3632-3642, (2017).
O'connell B., and Crockett S., The clinical impact of serrated colorectal polyps, Dove Press Journal, Clinical Epidemiology, 9: 113-125 (2017).
Oh, T. et al., Genome-Wide Identification and Validation of a Novel Methylation Biomarker, SDC2, for Blood-Based Detection of Colorectal Cancer, The Journal of Molecular Diagnostics, 15(4):498-507, (2013).
Potter, N. T. et al., Validation of a Real-Time PCR-Based Qualitative Assay for the Detection of Methylated SEPT9 DNA in Human Plasma, Clinical Chemistry, 60(9):1183-1191, (2014).
QIAamp® Circulating Nucleic Acid Handbook, For concentration and purification of free-circulating DNA, RNA, miRNA, and viral nucleic acids from human plasma, serum, urine, or other cell-free body fluids, Oct. 2019.
QIAamp® MinElute® ccfDNA Handbook, For concentration and purification of circulation cell-free DNA from plasma or serum, Jan. 2020.
Rahib, L., et. al., Projecting cancer incidence and deaths to 2030: the unexpected burden of thyroid, liver, and pancreas cancers in the United States, 74(11):2913-21, (2014).
Schwarzenbach, H. et al., Cell-free nucleic acids as biomarkers in cancer patients, Nature Reviews / Cancer, 11:426-437, (2011).
Shaukat, A. et al., Long-Term Mortality after Screening for Colorectal Cancer, The New England Journal of Medicine, 369(12):1106-1114, (2013).
Singh, K. E. et al., Colorectal Cancer Incidence Among Young Adults in California, Journal of Adolescent and Young Adult Oncology, 3(4):176-184, (2014).
Snyder, M.W. et al., Cell-free DNA Comprises an In vivo Nucleosome footprint that informs its Tissues-Of-Origin, Cell, 164: pp. 57-68, (2016).
Swarup, V. and Rajeswari, M.R., Circulating (cell-free) nucleic acids—A promising, non-invasive tool for early detection of several human diseases, FEBS Letters 581:795-799, (2007).
The Cancer Genome Atlas Program, <https://www.cancer.gov/about-nci/organization/ccg/research/structural-genomics/tcga>. Retrieved on Jul. 17, 2020.
Vainio, H., et al., IARC Handbooks of Cancer Prevention Programme Head: Harri Vainio. vol. 7: Breast Cancer Screening, pp. 1-236, (2002).
Van Der Vlugt, M. et al., Adherence to colorectal cancer screening: four rounds of faecal immunochemical test-based screening, British Journal of Cancer, 116(1):44-49, (2017).
Wittenberger, T. et al., DNA methylation markers for early detection of women's cancer: promise and challenges, Epigenomics, 6(3):311-327, (2014).
Yan, H., et. al., Identifying CpG sites with different differential methylation frequencies in colorectal cancer tissues based on individualized differential methylation analysis, Open Access Impact Journal, 29(8): 47356-47364, (2017).
Yang, Y., et. al., Identification of regulatory role of DNA methylation in colon cancer gene expression via systematic bioinformatics analysis, Medicine, 96(47):1-7, (2017).

* cited by examiner

METHODS AND SYSTEMS FOR IDENTIFYING METHYLATION BIOMARKERS

CROSS REFERENCE TO RELATED APPLICATIONS

This application is a U.S. non-provisional application, which claims priority to and benefit of U.S. Provisional Application No. 63/025,855 filed on May 15, 2020. The contents of which are incorporated by reference in their entirety.

TECHNICAL FIELD

This invention relates generally to methods, and systems for identifying biomarkers for detection of a disease or condition such as cancer.

BACKGROUND

Cancer screening is a critical component of cancer prevention, diagnosis, and treatment. For example, colorectal cancer (CRC) has been identified, according to some reports, as the third most common type of cancer and the second most frequent cause of cancer mortality in the world. According to some reports, there are over 1.8 million new cases of colorectal cancer per year and about 881,000 deaths from colorectal cancer, accounting for about 1 in 10 cancer deaths. Regular colorectal cancer screening is recommended, particularly for individuals over age 50. Moreover, incidence of colorectal cancer in individuals below 50 has increased over time. Statistics suggest that current colorectal cancer screening techniques are insufficient.

Deoxyribonucleic acid (DNA) methylation is one of the control mechanisms that guide cellular differentiation. For example, each cell receives a set of instructions from specific DNA methylation status, so that all the different cell types can be produced in human bodies. Deregulation of this cellular process is linked to some diseases, including cancer. A cancer cell can be created from accumulated changes in DNA methylation (e.g., hypermethylation or hypomethylation), especially when the changes are located in crucial genes. These changes in methylation status, if detected, can predict the development of cancer and/or locate the affected tissue.

The most common method for analyzing genome-wide methylation status of a given organism is whole genome bisulfite sequencing (WGBS). In this method, the methylation status of single cytosines of sample DNA is determined by first treating the DNA (e.g., in fragmented form) with sodium bisulfite before sequencing. DNA methylation is present in mammals mostly at CpG dinucleotides—a CpG dinucleotide is a region of DNA where a cytosine nucleotide is followed by a guanine nucleotide in the linear sequence of bases along its 5'→3' direction. In the WGBS technique, sodium bisulfite is used to convert unmethylated cytosines into uracil, while methylated forms of cytosine (e.g., 5-methylcytosine and 5-hydroxymethylcytosine) remain unchanged. The bisulfite-treated DNA fragments are then sequenced, e.g., via a next generation sequencing technique. Specific algorithms and/or tools such as Bismark (https://www.bioinformatics.babraham.ac.uk/projects/bismark/) are required for mapping the sequence reads and methylation calling in CpG, CHG and CHH context at single base resolution. Thus, the WGBS technique identifies single-cytosine methylation sites genome-wide. However, the method may have low resolution of specific short genomic regions that could be useful as biomarkers of a particular disease or condition on further differentially methylated region analysis context.

A current approach for estimating the methylation status of a CpG dinucleotide for each individual sample is to use a simple mean ratio between a number of methylated sequence reads (M) of this CpG dinucleotide and a total number of sequence reads (T) for this CpG dinucleotide. If methylation ratio average of the CpG is different among the groups (e.g., a control group and a pathological group) to a statistically significant extent, the CpG is proposed as a methylation biomarker. The process is repeated for other CpGs in the DNA sequence and statistically significant bases are proposed as biomarkers.

However, this approach has drawbacks. First, when there are no reads present in one of the comparative groups, this ratio simply cannot be computed. This effect can be significant in WGBS, where economical restrictions might limit the sequencing depth of the experiment. Second, the mean ratio does not take the number of sequence reads into consideration. For example, one methylated sequence read from two total sequence reads (M/T=1/2), and 50 methylated sequence reads from 100 total sequence reads (M/T=50/100) will result in the same ratio, even though the depth (significance) of each estimator is different. Thus, there is a need for improved methods, systems and apparatus for analyzing methylation status of DNA and identifying methylation biomarkers.

Definitions

A or An: The articles "a" and "an" are used herein to refer to one or to more than one (i.e., to at least one) of the grammatical object of the article. By way of example, "an element" refers to one element or more than one element.

About: The term "about", when used herein in reference to a value, refers to a value that is similar, in context, to the referenced value. In general, those skilled in the art, familiar with the context, will appreciate the relevant degree of variance encompassed by "about" in that context. For example, in some embodiments, e.g., as set forth herein, the term "about" can encompass a range of values that within 25%, 20%, 19%, 18%, 17%, 16%, 15%, 14%, 13%, 12%, 11%, 10%, 9%, 8%, 7%, 6%, 5%, 4%, 3%, 2%, 1%, or with a fraction of a percent, of the referred value.

Advanced adenoma: As used herein, the term "advanced adenoma" typically refers to refer to cells that exhibit first indications of relatively abnormal, uncontrolled, and/or autonomous growth but are not yet classified as cancerous alterations. In the context of colon tissue, "advanced adenoma" refers to neoplastic growth that shows signs of high grade dysplasia, and/or size that is >=10 mm, and/or villious histological type, and/or serrated histological type with any type of dysplasia.

Agent: As used herein, the term "agent" refers to an entity (e.g., for example, a small molecule, peptide, polypeptide, nucleic acid, lipid, polysaccharide, complex, combination, mixture, system, or phenomenon such as heat, electric current, electric field, magnetic force, magnetic field, etc.).

Amplicon or amplicon molecule: As used herein, the term "amplicon" or "amplicon molecule" refers to a nucleic acid molecule generated by transcription from a template nucleic acid molecule, or a nucleic acid molecule having a sequence complementary thereto, or a double-stranded nucleic acid including any such nucleic acid molecule. Transcription can be initiated from a primer.

Amplification: As used herein, the term "amplification" refers to the use of a template nucleic acid molecule in combination with various reagents to generate further nucleic acid molecules from the template nucleic acid molecule, which further nucleic acid molecules may be identical to or similar to (e.g., at least 70% identical, e.g., at least 75%, 80%, 85%, 90%, 91%, 92%, 93%, 94%, 95%, 96%, 97%, 98%, 99%, or 100% identical to) a segment of the template nucleic acid molecule and/or a sequence complementary thereto.

Biological Sample: As used herein, the term "biological sample" typically refers to a sample obtained or derived from a biological source (e.g., a tissue or organism or cell culture) of interest, as described herein. In some embodiments, e.g., as set forth herein, a biological source is or includes an organism, such as an animal or human. In some embodiments, e.g., as set forth herein, a biological sample is or includes biological tissue or fluid. In some embodiments, e.g., as set forth herein, a biological sample can be or include cells, tissue, or bodily fluid. In some embodiments, e.g., as set forth herein, a biological sample can be or include blood, blood cells, cell-free DNA, free floating nucleic acids, ascites, biopsy samples, surgical specimens, cell-containing body fluids, sputum, saliva, feces, urine, cerebrospinal fluid, peritoneal fluid, pleural fluid, lymph, gynecological fluids, secretions, excretions, skin swabs, vaginal swabs, oral swabs, nasal swabs, washings or lavages such as a ductal lavages or broncheoalveolar lavages, aspirates, scrapings, bone marrow. In some embodiments, e.g., as set forth herein, a biological sample is or includes cells obtained from a single subject or from a plurality of subjects. A sample can be a "primary sample" obtained directly from a biological source, or can be a "processed sample." A biological sample can also be referred to as a "sample."

Biomarker: As used herein, the term "biomarker," consistent with its use in the art, refers to an entity whose presence, level, or form, correlates with a particular biological event or state of interest, so that it is considered to be a "marker" of that event or state. Those of skill in the art will appreciate, for instance, in the context of a DNA biomarker, that a biomarker can be or include a locus (such as one or more methylation loci) and/or the status of a locus (e.g., the status of one or more methylation loci). To give but a few examples of biomarkers, in some embodiments, e.g., as set forth herein, a biomarker can be or include a marker for a particular disease, disorder or condition, or can be a marker for qualitative of quantitative probability that a particular disease, disorder or condition can develop, occur, or reoccur, e.g., in a subject. In some embodiments, e.g., as set forth herein, a biomarker can be or include a marker for a particular therapeutic outcome, or qualitative of quantitative probability thereof. Thus, in various embodiments, e.g., as set forth herein, a biomarker can be predictive, prognostic, and/or diagnostic, of the relevant biological event or state of interest. A biomarker can be an entity of any chemical class. For example, in some embodiments, e.g., as set forth herein, a biomarker can be or include a nucleic acid, a polypeptide, a lipid, a carbohydrate, a small molecule, an inorganic agent (e.g., a metal or ion), or a combination thereof. In some embodiments, e.g., as set forth herein, a biomarker is a cell surface marker. In some embodiments, e.g., as set forth herein, a biomarker is intracellular. In some embodiments, e.g., as set forth herein, a biomarker is found outside of cells (e.g., is secreted or is otherwise generated or present outside of cells, e.g., in a body fluid such as blood, urine, tears, saliva, cerebrospinal fluid, and the like). In some embodiments, e.g., as set forth herein, a biomarker is methylation status of a methylation locus. In some instances, e.g., as set forth herein, a biomarker may be referred to as a "marker." To give but one example of a biomarker, in some embodiments e.g., as set forth herein, the term refers to the expression of a product encoded by a gene, expression of which is characteristic of a particular tumor, tumor subclass, stage of tumor, etc. Alternatively or additionally, in some embodiments, e.g., as set forth herein, presence or level of a particular marker can correlate with activity (or activity level) of a particular signaling pathway, for example, of a signaling pathway the activity of which is characteristic of a particular class of tumors. Those of skill in the art will appreciate that a biomarker may be individually determinative of a particular biological event or state of interest, or may represent or contribute to a determination of the statistical probability of a particular biological event or state of interest. Those of skill in the art will appreciate that markers may differ in their specificity and/or sensitivity as related to a particular biological event or state of interest.

Blood component: As used herein, the term "blood component" refers to any component of whole blood, including red blood cells, white blood cells, plasma, platelets, endothelial cells, mesothelial cells, epithelial cells, and cell-free DNA. Blood components also include the components of plasma, including proteins, metabolites, lipids, nucleic acids, and carbohydrates, and any other cells that can be present in blood, e.g., due to pregnancy, organ transplant, infection, injury, or disease.

Cancer: As used herein, the terms "cancer," "malignancy," "neoplasm," "tumor," and "carcinoma," are used interchangeably to refer to a disease, disorder, or condition in which cells exhibit or exhibited relatively abnormal, uncontrolled, and/or autonomous growth, so that they display or displayed an abnormally elevated proliferation rate and/or aberrant growth phenotype. In some embodiments, e.g., as set forth herein, a cancer can include one or more tumors. In some embodiments e.g., as set forth herein, a cancer can be or include cells that are precancerous (e.g., benign), malignant, pre-metastatic, metastatic, and/or non-metastatic. In some embodiments e.g., as set forth herein, a cancer can be or include a solid tumor. In some embodiments e.g., as set forth herein, a cancer can be or include a hematologic tumor. In general, examples of different types of cancers known in the art include, for example, colorectal cancer, hematopoietic cancers including leukemias, lymphomas (Hodgkin's and non-Hodgkin's), myelomas and myeloproliferative disorders; sarcomas, melanomas, adenomas, carcinomas of solid tissue, squamous cell carcinomas of the mouth, throat, larynx, and lung, liver cancer, genitourinary cancers such as prostate, cervical, bladder, uterine, and endometrial cancer and renal cell carcinomas, bone cancer, pancreatic cancer, skin cancer, cutaneous or intraocular melanoma, cancer of the endocrine system, cancer of the thyroid gland, cancer of the parathyroid gland, head and neck cancers, breast cancer, gastro-intestinal cancers and nervous system cancers, benign lesions such as papillomas, and the like.

Comparable: As used herein, the term "comparable" refers to members within sets of two or more conditions, circumstances, agents, entities, populations, etc., that may not be identical to one another but that are sufficiently similar to permit comparison there between, such that one of skill in the art will appreciate that conclusions can reasonably be drawn based on differences or similarities observed. In some embodiments, e.g., as sort forth herein, comparable sets of conditions, circumstances, agents, entities, populations, etc. are typically characterized by a plurality of substantially identical features and zero, one, or a plurality of differing features. Those of ordinary skill in the art will understand, in context, what degree of identity is required to render members of a set comparable. For example, those of ordinary skill in the art will appreciate that members of sets of conditions, circumstances, agents, entities, populations, etc., are comparable to one another when characterized by a sufficient number and type of substantially identical features to warrant a reasonable conclusion that differences observed can be attributed in whole or part to non-identical features thereof.

Diagnosis: As used herein, the term "Diagnosis" refers to determining whether, and/or the qualitative or quantitative probability that, a subject has or will develop a disease, disorder, condition, or state. For example, in diagnosis of cancer, diagnosis can include a determination regarding the risk, type, stage, malignancy, or other classification of a cancer. In some instances, e.g., as sort forth herein, a diagnosis can be or include a determination relating to prognosis and/or likely response to one or more general or particular therapeutic agents or regimens.

Differentially methylated: As used herein, the term "differentially methylated" describes a methylation site for which the methylation status differs between a first condition and a second condition. A methylation site that is differentially methylated can be referred to as a differentially methylated site. In some instances, e.g., as sort forth herein, a DMR is defined by the amplicon produced by amplification using oligonucleotide primers, e.g., a pair of oligonucleotide primers selected for amplification of the DMR or for amplification of a DNA region of interest present in the amplicon. In some instances, e.g., as sort forth herein, a DMR is defined as a DNA region amplified by a pair of oligonucleotide primers, including the region having the sequence of, or a sequence complementary to, the oligonucleotide primers. In some instances, e.g., as sort forth herein, a DMR is defined as a DNA region amplified by a pair of oligonucleotide primers, excluding the region having the sequence of, or a sequence complementary to, the oligonucleotide primers.

Differentially methylated region: As used herein, the term "differentially methylated region" (DMR) refers to a DNA region that includes one or more differentially methylated sites. A DMR that includes a greater number or frequency of methylated sites under a selected condition of interest, such as a cancerous state, can be referred to as a hypermethylation DMR. A DMR that includes a smaller number or frequency of methylated sites under a selected condition of interest, such as a cancerous state, can be referred to as a hypomethylation DMR. A DMR that is a methylation biomarker for colorectal cancer can be referred to as a colorectal cancer DMR. In some instances, e.g., as set forth herein, a DMR can be a single nucleotide, which single nucleotide is a methylation site. In some instances, e.g., as set forth herein, a DMR has a length of at least 10, at least 15, at least 20, at least 24, at least 50, or at least 75 base pairs. In some instances, e.g., as set forth herein, a DMR has a length of less than 1000, less than 750, less than 500, less than 350, less than 300, or less than 250 base pairs (e.g., where methylation status is determined using bisulfite sequencing, e.g., whole genome bisulfite sequencing (WGBS)). In some instances, e.g., as set forth herein, a DMR that is a methylation biomarker for advanced adenoma may also be useful in identification of colorectal cancer.

DNA region: As used herein, "DNA region" refers to any contiguous portion of a larger DNA molecule. Those of skill in the art will be familiar with techniques for determining whether a first DNA region and a second DNA region correspond, based, e.g., on sequence similarity (e.g, sequence identity or homology) of the first and second DNA regions and/or context (e.g., the sequence identity or homology of nucleic acids upstream and/or downstream of the first and second DNA regions). Except as otherwise specified herein, sequences found in or relating to humans (e.g., that hybridize to human DNA) are found in, based on, and/or derived from the example representative human genome sequence commonly referred to, and known to those of skill in the art, as *Homo sapiens* (human) genome assembly GRCh38, hg38, and/or Genome Reference Consortium Human Build 38. Those of skill in the art will further appreciate that DNA regions of hg38 can be referred to by a known system including identification of particular nucleotide positions or ranges thereof in accordance with assigned numbering.

Downstream: As used herein, the term "downstream" means that a first DNA region is closer, relative to a second DNA region, to the C-terminus of a nucleic acid that includes the first DNA region and the second DNA region.

Gene: As used herein, the term "gene" refers to a single DNA region, e.g., in a chromosome, that includes a coding sequence that encodes a product (e.g., an RNA product and/or a polypeptide product), together with all, some, or none of the DNA sequences that contribute to regulation of the expression of coding sequence. In some embodiments, e.g., as set forth herein, a gene includes one or more non-coding sequences. In some particular embodiments, e.g., as set forth herein, a gene includes exonic and intronic sequences. In some embodiments, e.g., as set forth herein, a gene includes one or more regulatory elements that, for example, can control or impact one or more aspects of gene expression (e.g., cell-type-specific expression, inducible expression, etc.). In some embodiments, e.g., as set forth herein, a gene includes a promoter. In some embodiments, e.g., as set forth herein, a gene includes one or both of a (i) DNA nucleotides extending a predetermined number of nucleotides upstream of the coding sequence and (ii) DNA nucleotides extending a predetermined number of nucleotides downstream of the coding sequence. In various embodiments, e.g., as set forth herein, the predetermined number of nucleotides can be 500 bp, 1 kb, 2 kb, 3 kb, 4 kb, 5 kb, 10 kb, 20 kb, 30 kb, 40 kb, 50 kb, 75 kb, or 100 kb.

Hybridize: As used herein, "hybridize" refers to the association of a first nucleic acid with a second nucleic acid to form a double-stranded structure, which association occurs through complementary pairing of nucleotides. Those of skill in the art will recognize that complementary sequences, among others, can hybridize. In various embodiments, e.g., as set forth herein, hybridization can occur, for example, between nucleotide sequences having at least 70% complementarity, e.g., at least 75%, 80%, 85%, 90%, 91%, 92%, 93%, 94%, 95%, 96%, 97%, 98%, 99%, or 100% complementarity. Those of skill in the art will further appreciate that whether hybridization of a first nucleic acid and a second nucleic acid does or does not occur can depend upon various reaction conditions. Conditions under which hybridization can occur are known in the art.

Hypomethylation: As used herein, the term "hypomethylation" refers to the state of a methylation locus having at least one fewer methylated nucleotides in a state of interest as compared to a reference state (e.g., at least one fewer methylated nucleotides in colorectal cancer than in healthy control).

Hypermethylation: As used herein, the term "hypermethylation" refers to the state of a methylation locus having at least one more methylated nucleotides in a state of interest as compared to a reference state (e.g., at least one more methylated nucleotides in colorectal cancer than in healthy control).

Identical: As used herein, the terms "identical" refers to the overall relatedness between polymeric molecules, e.g., between nucleic acid molecules (e.g., DNA molecules and/or RNA molecules) and/or between polypeptide molecules. Methods for the calculation of a percent identity as between two provided sequences are known in the art. Calculation of the percent identity of two nucleic acid or polypeptide sequences, for example, can be performed by aligning the two sequences (or the complement of one or both sequences) for optimal comparison purposes (e.g., gaps can be introduced in one or both of a first and a second sequences for optimal alignment and non-identical sequences can be disregarded for comparison purposes). The nucleotides or amino acids at corresponding positions are then compared. When a position in the first sequence is occupied by the same residue (e.g., nucleotide or amino acid) as the corresponding position in the second sequence, then the molecules are identical at that position. The percent identity between the two sequences is a function of the number of identical positions shared by the sequences and, optionally, taking into account the number of gaps and the length of each gap, which may need to be introduced for optimal alignment of the two sequences. The comparison of sequences and determination of percent identity between two sequences can be accomplished using a computational algorithm, such as BLAST (basic local alignment search tool).

Improved, increased, or reduced: As used herein, these terms, or grammatically comparable comparative terms, indicate values that are relative to a comparable reference measurement. For example, in some embodiments, e.g., as set forth herein, an assessed value achieved with an agent of interest may be "improved" relative to that obtained with a comparable reference agent or with no agent. Alternatively or additionally, in some embodiments, e.g., as set forth herein, an assessed value in a subject or system of interest may be "improved" relative to that obtained in the same subject or system under different conditions or at a different point in time (e.g., prior to or after an event such as administration of an agent of interest), or in a different, comparable subject (e.g., in a comparable subject or system that differs from the subject or system of interest in presence of one or more indicators of a particular disease, disorder or condition of interest, or in prior exposure to a condition or agent, etc.). In some embodiments, e.g., as set forth herein, comparative terms refer to statistically relevant differences (e.g., differences of a prevalence and/or magnitude sufficient to achieve statistical relevance). Those of skill in the art will be aware, or will readily be able to determine, in a given context, a degree and/or prevalence of difference that is required or sufficient to achieve such statistical significance.

Methylation: As used herein, the term "methylation" includes methylation at any of (i) C5 position of cytosine; (ii) N4 position of cytosine; and (iii) the N6 position of adenine. Methylation also includes (iv) other types of nucleotide methylation. A nucleotide that is methylated can be referred to as a "methylated nucleotide" or "methylated nucleotide base." In certain embodiments, e.g., as set forth herein, methylation specifically refers to methylation of cytosine residues. In some instances, methylation specifically refers to methylation of cytosine residues present in CpG sites.

Methylation assay: As used herein, the term "methylation assay" refers to any technique that can be used to determine the methylation status of a methylation locus.

Methylation biomarker: As used herein, the term "methylation biomarker" refers to a biomarker that is or includes at least one methylation locus and/or the methylation status of at least one methylation locus, e.g., a hypermethylated locus. In particular, a methylation biomarker is a biomarker characterized by a change between a first state and a second state (e.g., between a cancerous state and a non-cancerous state) in methylation status of one or more nucleic acid loci.

Methylation locus: As used herein, the term "methylation locus" refers to a DNA region that includes at least one differentially methylated region. A methylation locus that includes a greater number or frequency of methylated sites under a selected condition of interest, such as a cancerous state, can be referred to as a hypermethylated locus. A methylation locus that includes a smaller number or frequency of methylated sites under a selected condition of interest, such as a cancerous state, can be referred to as a hypomethylated locus. In some instances, e.g., as set forth herein, a methylation locus has a length of at least 10, at least 15, at least 20, at least 24, at least 50, or at least 75 base pairs. In some instances, e.g., as set forth herein, a methylation locus has a length of less than 1000, less than 750, less than 500, less than 350, less than 300, or less than 250 base pairs (e.g., where methylation status is determined using bisulfite sequencing, e.g., whole genome bisulfite sequencing (WGBS)).

Methylation site: As used herein, a methylation site refers to a nucleotide or nucleotide position that is methylated in at least one condition. In its methylated state, a methylation site can be referred to as a methylated site.

Methylation status: As used herein, "methylation status," "methylation state," or "methylation profile" refers to the number, frequency, or pattern of methylation at methylation sites within a methylation locus. Accordingly, a change in methylation status between a first state and a second state can be or include an increase in the number, frequency, or pattern of methylated sites, or can be or include a decrease in the number, frequency, or pattern of methylated sites. In various instances, a change in methylation status is a change in methylation value.

Methylation value: As used herein, the term "methylation value" refers to a numerical representation of a methylation status, e.g., in the form of a number that represents the frequency or ratio of methylation of a methylation locus. In some instances, e.g., as set forth herein, a methylation value can be generated by a method that includes quantifying the amount of intact nucleic acid present in a sample following restriction digestion of the sample with a methylation dependent restriction enzyme. In some instances, e.g., as set forth herein, a methylation value can be generated by a method that includes comparing amplification profiles after bisulfite reaction of a sample. In some instances, e.g., as set forth herein, a methylation value can be generated by comparing sequences of bisulfite-treated and untreated nucleic acids. In some instances, e.g., as set forth herein, a methylation value is, includes, or is based on a bisulfite sequencing result.

Nucleic acid: As used herein, in its broadest sense, the term "nucleic acid" refers to any compound and/or substance that is or can be incorporated into an oligonucleotide chain. In some embodiments e.g., as set forth herein, a nucleic acid is a compound and/or substance that is or can be incorporated into an oligonucleotide chain via a phosphodiester linkage. As will be clear from context, in some embodiments e.g., as set forth herein, the term nucleic acid refers to an individual nucleic acid residue (e.g., a nucleotide and/or nucleoside), and in some embodiments e.g., as set forth herein refers to an polynucleotide chain comprising a plurality of individual nucleic acid residues. A nucleic acid can be or include DNA, RNA, or a combination thereof. A nucleic acid can include natural nucleic acid residues, nucleic acid analogs, and/or synthetic residues. In some embodiments e.g., as set forth herein, a nucleic acid includes natural nucleotides (e.g., adenosine, thymidine, guanosine, cytidine, uridine, deoxyadenosine, deoxythymidine, deoxy guanosine, and deoxycytidine). In some embodiments e.g., as set forth herein, a nucleic acid is or includes of one or more nucleotide analogs (e.g., 2-aminoadenosine, 2-thiothymidine, inosine, pyrrolo-pyrimidine, 3-methyl adenosine, 5-methylcytidine, C-5 propynyl-cytidine, C-5 propynyl-uridine, 2-aminoadenosine, C5-bromouridine, C5-fluorouridine, C5-iodouridine, C5-propynyl-uridine, C5-propynyl-cytidine, C5-methylcytidine, 2-aminoadenosine, 7-deazaadenosine, 7-deazaguanosine, 8-oxoadenosine, 8-oxoguanosine, 0(6)-methylguanine, 2-thiocytidine, methylated bases, intercalated bases, and combinations thereof).

In some embodiments e.g., as set forth herein, a nucleic acid has a nucleotide sequence that encodes a functional gene product such as an RNA or protein. In some embodiments e.g., as set forth herein, a nucleic acid includes one or more introns. In some embodiments e.g., as set forth herein, a nucleic acid includes one or more genes. In some embodiments e.g., as set forth herein, nucleic acids are prepared by one or more of isolation from a natural source, enzymatic synthesis by polymerization based on a complementary template (in vivo or in vitro), reproduction in a recombinant cell or system, and chemical synthesis.

In some embodiments e.g., as set forth herein, a nucleic acid analog differs from a nucleic acid in that it does not utilize a phosphodiester backbone. For example, in some embodiments e.g., as set forth herein, a nucleic acid can include one or more peptide nucleic acids, which are known in the art and have peptide bonds instead of phosphodiester bonds in the backbone. Alternatively or additionally, in some embodiments e.g., as set forth herein, a nucleic acid has one or more phosphorothioate and/or 5'-N-phosphoramidite linkages rather than phosphodiester bonds. In some embodiments e.g., as set forth herein, a nucleic acid comprises one or more modified sugars (e.g., 2'-fluororibose, ribose, 2'-deoxyribose, arabinose, and hexose) as compared with those in natural nucleic acids.

In some embodiments, e.g., as set forth herein, a nucleic acid is or includes at least 3, 4, 5, 6, 7, 8, 9, 10, 15, 20, 25, 30, 35, 40, 45, 50, 55, 60, 65, 70, 75, 80, 85, 90, 95, 100, 110, 120, 130, 140, 150, 160, 170, 180, 190, 200, 225, 250, 275, 300, 325, 350, 375, 400, 425, 450, 475, 500, 600, 700, 800, 900, 1000, 1500, 2000, 2500, 3000, 3500, 4000, 4500, 5000 or more residues. In some embodiments, e.g., as set forth herein, a nucleic acid is partly or wholly single stranded, or partly or wholly double stranded.

Nucleotide: As used herein, the term "nucleotide" refers to a structural component, or building block, of polynucleotides, e.g., of DNA and/or RNA polymers. A nucleotide includes of a base (e.g., adenine, thymine, uracil, guanine, or cytosine) and a molecule of sugar and at least one phosphate group. As used herein, a nucleotide can be a methylated nucleotide or an un-methylated nucleotide. Those of skill in the art will appreciate that nucleic acid terminology, such as, as examples, "locus" or "nucleotide" can refer to both a locus or nucleotide of a single nucleic acid molecule and/or to the cumulative population of loci or nucleotides within a plurality of nucleic acids (e.g., a plurality of nucleic acids in a sample and/or representative of a subject) that are representative of the locus or nucleotide (e.g., having the same identical nucleic acid sequence and/or nucleic acid sequence context, or having a substantially identical nucleic acid sequence and/or nucleic acid context).

Oligonucleotide primer: As used herein, the term oligonucleotide primer, or primer, refers to a nucleic acid molecule used, capable of being used, or for use in, generating amplicons from a template nucleic acid molecule. Under transcription-permissive conditions (e.g., in the presence of nucleotides and a DNA polymerase, and at a suitable temperature and pH), an oligonucleotide primer can provide a point of initiation of transcription from a template to which the oligonucleotide primer hybridizes. Typically, an oligonucleotide primer is a single-stranded nucleic acid between 5 and 200 nucleotides in length. Those of skill in the art will appreciate that optimal primer length for generating amplicons from a template nucleic acid molecule can vary with conditions including temperature parameters, primer composition, and transcription or amplification method. A pair of oligonucleotide primers, as used herein, refers to a set of two oligonucleotide primers that are respectively complementary to a first strand and a second strand of a template double-stranded nucleic acid molecule. First and second members of a pair of oligonucleotide primers may be referred to as a "forward" oligonucleotide primer and a "reverse" oligonucleotide primer, respectively, with respect to a template nucleic acid strand, in that the forward oligonucleotide primer is capable of hybridizing with a nucleic acid strand complementary to the template nucleic acid strand, the reverse oligonucleotide primer is capable of hybridizing with the template nucleic acid strand, and the position of the forward oligonucleotide primer with respect to the template nucleic acid strand is 5' of the position of the reverse oligonucleotide primer sequence with respect to the template nucleic acid strand. It will be understood by those of skill in the art that the identification of a first and second oligonucleotide primer as forward and reverse oligonucleotide primers, respectively, is arbitrary inasmuch as these identifiers depend upon whether a given nucleic acid strand or its complement is utilized as a template nucleic acid molecule.

Overlapping: The term "overlapping" is used herein in reference to two regions of DNA, each of which contains a sub-sequence that is substantially identical to a sub-sequence of the same length in the other region (e.g., the two regions of DNA have a common sub-sequence). "Substantially identical" means that the two identically-long sub-sequences differ by fewer than a given number of base pairs. In certain instances, e.g., as set forth herein, each sub-sequence has a length of at least 20 base pairs that differ by fewer than 4, 3, 2, or 1 base pairs from each other (e.g., the two sub-sequences having at least 80%, at least 85%, at least 90%, at least 95% similarity, at least 97% similarity, at least 98% similarity, at least 99% similarity, or at least 99.5% similarity). In certain instances, e.g., as set forth herein, each sub-sequence has a length of at least 24 base pairs that differ by fewer than 5, 4, 3, 2, or 1 base pairs (e.g., the two sub-sequences having at least 80%, at least 85%, at least 90%, at least 95% similarity, at least 97% similarity, at least 98% similarity, at least 99% similarity, or at least 99.5% similarity). In certain instances, e.g., as set forth herein, each sub-sequence has a length of at least 50 base pairs that differ by fewer than 10, 9, 8, 7, 6, 5, 4, 3, 2, or 1 base pairs (e.g., the two sub-sequences having at least 80%, at least 85%, at least 90%, at least 95% similarity, at least 97% similarity, at least 98% similarity, at least 99% similarity, or at least 99.5% similarity). In certain instances, e.g., as set forth herein, each sub-sequence has a length of at least 100 base pairs that differ by fewer than 20, 15, 10, 9, 8, 7, 6, 5, 4, 3, 2, or 1 base pairs (e.g., the two sub-sequences having at least 80%, at least 85%, at least 90%, at least 95% similarity, at least 97% similarity, at least 98% similarity, at least 99% similarity, or at least 99.5% similarity). In certain instances, e.g., as set forth herein, each sub-sequence has a length of at least 200 base pairs that differ by fewer than 40, 30, 20, 15, 10, 9, 8, 7, 6, 5, 4, 3, 2, or 1 base pairs (e.g., the two sub-sequences having at least 80%, at least 85%, at least 90%, at least 95% similarity, at least 97% similarity, at least 98% similarity, at least 99% similarity, or at least 99.5% similarity). In certain instances, e.g., as set forth herein, each sub-sequence has a length of at least 250 base pairs that differ by fewer than 50, 40, 30, 20, 15, 10, 9, 8, 7, 6, 5, 4, 3, 2, or 1 base pairs (e.g., the two sub-sequences having at least 80%, at least 85%, at least 90%, at least 95% similarity, at least 97% similarity, at least 98% similarity, at least 99% similarity, or at least 99.5% similarity). In certain instances, e.g., as set forth herein, each sub-sequence has a length of at least 300 base pairs that differ by fewer than 60, 50, 40, 30, 20, 15, 10, 9, 8, 7, 6, 5, 4, 3, 2, or 1 base pairs (e.g., the two sub-sequences having at least 80%, at least 85%, at least 90%, at least 95% similarity, at least 97% similarity, at least 98% similarity, at least 99% similarity, or at least 99.5% similarity). In certain instances, e.g., as set forth herein, each sub-sequence has a length of at least 500 base pairs that differ by fewer than 100, 60, 50, 40, 30, 20, 15, 10, 9, 8, 7, 6, 5, 4, 3, 2, or 1 base pairs (e.g., the two sub-sequences having at least 80%, at least 85%, at least 90%, at least 95% similarity, at least 97% similarity, at least 98% similarity, at least 99% similarity, or at least 99.5% similarity). In certain instances, e.g., as set forth herein, each sub-sequence has a length of at least 1000 base pairs that differ by fewer than 200, 100, 60, 50, 40, 30, 20, 15, 10, 9, 8, 7, 6, 5, 4, 3, 2, or 1 base pairs (e.g., the two sub-sequences having at least 80%, at least 85%, at least 90%, at least 95% similarity, at least 97% similarity, at least 98% similarity, at least 99% similarity, or at least 99.5% similarity). In certain instances, e.g., as set forth herein, the subsequence of a first region of the two regions of DNA may comprise the entirety of the second region of the two regions of DNA (or vice versa) (e.g., the common sub-sequence may contain the whole of either or both regions). In certain embodiments, where a methylation locus has a sequence that comprises "at least a portion of" a DMR sequence listed herein (e.g., at least 20%, at least 30%, at least 40%, at least 50%, at least 60%, at least 70%, at least 80%, or at least 90% of the DMR sequence), the overlapping portion of the methylation locus has at least 95% similarity, at least 98% similarity, or at least 99% similarity with the overlapping portion of the DMR sequence (e.g., if the overlapping portion is 100 bp, the portion of the methylation locus that overlaps with the portion of the DMR differs by no more than 1 bp, no more than 2 bp, or no more than 5 bp). In certain embodiments, where a methylation locus has a sequence that comprises "at least a portion of" a DMR sequence listed herein, this means the methylation locus has a subsequence in common with the DMR sequence that has a consecutive series of bases that covers at least 20%, at least 30%, at least 40%, at least 50%, at least 60%, at least 70%, at least 80%, or at least 90% of the DMR sequence, e.g., wherein the subsequence in common differs by no more than 1 bp, no more than 2 bp, or no more than 5 bp). In certain embodiments, where a methylation locus has a sequence that comprises "at least a portion of" a DMR sequence listed herein, this means the methylation locus contains at least a portion of (e.g., at least 20%, at least 30%, at least 40%, at least 50%, at least 60%, at least 70%, at least 80%, or at least 90% of) the CpG dinucleotides corresponding to the CpG dinucleotides within the DMR sequence.

Probe: As used herein, the term "probe" refers to a single- or double-stranded nucleic acid molecule that is capable of hybridizing with a complementary target and includes a detectable moiety. In certain embodiments, e.g., as set forth herein, a probe is a restriction digest product or is a synthetically produced nucleic acid, e.g., a nucleic acid produced by recombination or amplification. In some instances, e.g., as set forth herein, a probe is a capture probe useful in detection, identification, and/or isolation of a target sequence, such as a gene sequence. In various instances, e.g., as set forth herein, a detectable moiety of probe can be, e.g., an enzyme (e.g., ELISA, as well as enzyme-based histochemical assays), fluorescent moiety, radioactive moiety, or moiety associated with a luminescence signal.

Promoter: As used herein, a "promoter" can refer to a DNA regulatory region that directly or indirectly (e.g., through promoter-bound proteins or substances) associates with an RNA polymerase and participates in initiation of transcription of a coding sequence.

Reference: As used herein describes a standard or control relative to which a comparison is performed. For example, in some embodiments, e.g., as set forth herein, an agent, subject, animal, individual, population, sample, sequence, or value of interest is compared with a reference or control agent, subject, animal, individual, population, sample, sequence, or value. In some embodiments, e.g., as set forth herein, a reference or characteristic thereof is tested and/or determined substantially simultaneously with the testing or determination of the characteristic in a sample of interest. In some embodiments, e.g., as set forth herein, a reference is a historical reference, optionally embodied in a tangible medium. Typically, as would be understood by those of skill in the art, a reference is determined or characterized under comparable conditions or circumstances to those under assessment, e.g., with regard to a sample. Those skilled in the art will appreciate when sufficient similarities are present to justify reliance on and/or comparison to a particular possible reference or control.

Risk: As used herein with respect to a disease, disorder, or condition, the term "risk" refers to the qualitative or quantitative probability (whether expressed as a percentage or otherwise) that a particular individual will develop the disease, disorder, or condition. In some embodiments, e.g., as set forth herein, risk is expressed as a percentage. In some embodiments, e.g., as set forth herein, a risk is a qualitative or quantitative probability that is equal to or greater than 0, 1, 2, 3, 4, 5, 6, 7, 8, 9, 10, 20, 30, 40, 50, 60, 70, 80, 90, or 100%. In some embodiments, e.g., as set forth herein, risk is expressed as a qualitative of quantitative level of risk relative to a reference risk or level or the risk of the same outcome attributed to a reference. In some embodiments, e.g., as set forth herein, relative risk is increased or decreased in comparison to the reference sample by a factor of 1.1, 1.2, 1.3, 1.4, 1.5, 1.6, 1.7, 1.8, 1.9, 2, 3, 4, 5, 6, 7, 8, 9, 10, or more.

Sample: As used herein, the term "sample" typically refers to an aliquot of material obtained or derived from a source of interest. In some embodiments, e.g., as set forth herein, a source of interest is a biological or environmental source. In some embodiments, e.g., as set forth herein, a sample is a "primary sample" obtained directly from a source of interest. In some embodiments, e.g., as set forth herein, as will be clear from context, the term "sample" refers to a preparation that is obtained by processing of a primary sample (e.g., by removing one or more components of and/or by adding one or more agents to a primary sample). Such a "processed sample" can include, for example cells, nucleic acids, or proteins extracted from a sample or obtained by subjecting a primary sample to techniques such as amplification or reverse transcription of nucleic acids, isolation and/or purification of certain components, etc.

In certain instances, e.g., as set forth herein, a processed sample can be a DNA sample that has been amplified (e.g., pre-amplified). Thus, in various instances, e.g., as set forth herein, an identified sample can refer to a primary form of the sample or to a processed form of the sample. In some instances, e.g., as set forth herein, a sample that is enzyme-digested DNA can refer to primary enzyme-digested DNA (the immediate product of enzyme digestion) or a further processed sample such as enzyme-digested DNA that has been subject to an amplification step (e.g., an intermediate amplification step, e.g., pre-amplification) and/or to a filtering step, purification step, or step that modifies the sample to facilitate a further step, e.g., in a process of determining methylation status (e.g., methylation status of a primary sample of DNA and/or of DNA as it existed in its original source context).

Screening: As used herein, the term "screening" refers to any method, technique, process, or undertaking intended to generate diagnostic information and/or prognostic information. Accordingly, those of skill in the art will appreciate that the term screening encompasses method, technique, process, or undertaking that determines whether an individual has, is likely to have or develop, or is at risk of having or developing a disease, disorder, or condition, e.g., colorectal cancer.

Specificity: As used herein, the "specificity" of a biomarker refers to the percentage of samples that are characterized by absence of the event or state of interest for which measurement of the biomarker accurately indicates absence of the event or state of interest (true negative rate). In various embodiments, e.g., as set forth herein, characterization of the negative samples is independent of the biomarker, and can be achieved by any relevant measure, e.g., any relevant measure known to those of skill in the art. Thus, specificity reflects the probability that the biomarker would detect the absence of the event or state of interest when measured in a sample not characterized that event or state of interest. In particular embodiments in which the event or state of interest is colorectal cancer, e.g., as set forth herein, specificity refers to the probability that a biomarker would detect the absence of colorectal cancer in a subject lacking colorectal cancer. Lack of colorectal cancer can be determined, e.g., by histology.

Sensitivity: As used herein, the "sensitivity" of a biomarker refers to the percentage of samples that are characterized by the presence of the event or state of interest for which measurement of the biomarker accurately indicates presence of the event or state of interest (true positive rate). In various embodiments, e.g., as set forth herein, characterization of the positive samples is independent of the biomarker, and can be achieved by any relevant measure, e.g., any relevant measure known to those of skill in the art. Thus, sensitivity reflects the probability that a biomarker would detect the presence of the event or state of interest when measured in a sample characterized by presence of that event or state of interest. In particular embodiments in which the event or state of interest is colorectal cancer, e.g., as set forth herein, sensitivity refers to the probability that a biomarker would detect the presence of colorectal cancer in a subject that has colorectal cancer. Presence of colorectal cancer can be determined, e.g., by histology.

Stage of cancer: As used herein, the term "stage of cancer" refers to a qualitative or quantitative assessment of the level of advancement of a cancer. In some embodiments, e.g., as set forth herein, criteria used to determine the stage of a cancer can include, but are not limited to, one or more areas of where the cancer is located in a body, tumor size, whether the cancer has spread to lymph nodes, whether the cancer has spread to one or more different parts of the body, etc. In some embodiments, e.g., as set forth herein, cancer can be staged using the so-called TNM System, according to which T refers to the size and extent of the main tumor, usually called the primary tumor; N refers to the number of nearby lymph nodes that have cancer; and M refers to whether the cancer has metastasized. In some embodiments, e.g., as set forth herein, a cancer can be referred to as Stage 0 (abnormal cells are present but have not spread to nearby tissue, also called carcinoma in situ, or CIS; CIS is not cancer, but it can become cancer), Stage I-III (cancer is present; the higher the number, the larger the tumor and the more it has spread into nearby tissues), or Stage IV (the cancer has spread to distant parts of the body). In some embodiments, e.g., as set forth herein, a cancer can be assigned to a stage selected from the group consisting of: in situ (abnormal cells are present but have not spread to nearby tissue); localized (cancer is limited to the place where it started, with no sign that it has spread); regional (cancer has spread to nearby lymph nodes, tissues, or organs): distant (cancer has spread to distant parts of the body); and unknown (there is not enough information to identify cancer stage).

Subject: As used herein, the term "subject" refers to an organism, typically a mammal (e.g., a human). In some embodiments, e.g., as set forth herein, a subject is suffering from a disease, disorder or condition. In some embodiments, e.g., as set forth herein, a subject is susceptible to a disease, disorder, or condition. In some embodiments, e.g., as set forth herein, a subject displays one or more symptoms or characteristics of a disease, disorder or condition. In some embodiments, e.g., as set forth herein, a subject is not suffering from a disease, disorder or condition. In some embodiments, e.g., as set forth herein, a subject does not display any symptom or characteristic of a disease, disorder, or condition. In some embodiments, e.g., as set forth herein, a subject is someone with one or more features characteristic of susceptibility to or risk of a disease, disorder, or condition. In some embodiments, e.g., as set forth herein, a subject is a patient. In some embodiments, e.g., as set forth herein, a subject is an individual to whom diagnosis has been performed and/or to whom therapy has been administered. In some instances, e.g., as set forth herein—a human subject can be interchangeably referred to as an "individual."

Treatment: As used herein, the term "treatment" (also "treat" or "treating") refers to administration of a therapy that partially or completely alleviates, ameliorates, relieves, inhibits, delays onset of, reduces severity of, and/or reduces incidence of one or more symptoms, features, and/or causes of a particular disease, disorder, or condition, or is administered for the purpose of achieving any such result. In some embodiments, e.g., as set forth herein, such treatment can be of a subject who does not exhibit signs of the relevant disease, disorder, or condition and/or of a subject who exhibits only early signs of the disease, disorder, or condition. Alternatively or additionally, such treatment can be of a subject who exhibits one or more established signs of the relevant disease, disorder and/or condition. In some embodiments, e.g., as set forth herein, treatment can be of a subject who has been diagnosed as suffering from the relevant disease, disorder, and/or condition. In some embodiments, e.g., as set forth herein, treatment can be of a subject known to have one or more susceptibility factors that are statistically correlated with increased risk of development of the relevant disease, disorder, or condition. In various examples, treatment is of a cancer.

Upstream: As used herein, the term "upstream" means a first DNA region is closer, relative to a second DNA region, to the N-terminus of a nucleic acid that includes the first DNA region and the second DNA region.

Unmethylated: As used herein, the terms "unmethylated" and "non-methylated" are used interchangeably and mean that an identified DNA region includes no methylated nucleotides.

SUMMARY

Described herein are various systems, methods, and apparatus for identifying biomarkers for detection of a disease or condition such as advanced adenoma, colorectal cancer, or other cancers. In certain embodiments, the present invention relates to methods and/or systems for identifying one or more biomarkers related to methylation status in deoxyribonucleic acid (DNA) of a human subject and/or detecting (e.g., screening for) cancer based on one or more known biomarkers (e.g., the identified biomarkers).

In certain embodiments, the methods and/or systems described herein can identify differentially methylated CpG dinucleotides (DMCs) from sequencing reads of DNA (e.g., whole genome, e.g., as part of a WGBS sequencing technique or, alternatively, an enzymatic sequencing approach). The accurate identification of DMCs allows for the identification of one or more new biomarkers. For example, the method may identify the methylation status of hundreds of thousands or millions of CpGs, identify differentially methylated CpGs (DMCs) that are likely informative of the disease or condition, and identify differentially methylated regions (DMRs) of the DNA that contain one or more of the DMCs (e.g., that are dense in DMCs), wherein the DMRs are biomarkers for the disease or condition. Once these DMR biomarkers are known, samples of subjects having unknown disease status may be tested by simply identifying the methylation status of the specific DMR regions. If, for a particular subject, the methylation status of one or more DMR regions reaches a particular threshold or falls within a particular range, the disease status of the subject may be identified or predicted.

In certain embodiments, the present methods and/or systems utilize a linear regression analysis to extract linear dependency (e.g., methylation proportion) between (i) a total number of sequence reads (T) and (ii) a number of methylated sequence reads (M). This approach has advantages over the conventional methods (e.g., mean ratio of M/T). For example, the present methods and/or systems take the total number of sequence reads (T) into consideration. Furthermore, in certain embodiments, the present methods and/or systems can reduce the number of degrees of freedom in the linear regression analysis by forcing the linear regression line to extend from origin (0,0). In such embodiments, the present methods and/or systems are more computationally efficient than the conventional methods. Still further, in such embodiments, the present methods and/or systems can obtain reliable methylation proportion, even when some samples have no reads (e.g., (M, T)=(0,0)).

In one aspect, the invention is directed to a method of identifying a methylation biomarker (e.g., a CpG dinucleotide) that is informative of the presence and/or absence of a disease or condition in a subject, the method comprising: (a) accessing, by a processor of a computing device, a collection of data points (T, M) from samples, wherein: the collection of data points is obtained from sequencing reads of DNA (e.g., cell-free DNA) following treatment (e.g., bisulfite treatment or enzymatic treatment) to distinguish methylated and unmethylated CpG cytosines, said sequencing reads including reads of a first CpG dinucleotide, wherein the first CpG dinucleotide is identified according to reference genome and at a specific known genomic position in the DNA and is being evaluated to determine whether it is a methylation biomarker that is informative of the presence and/or absence of the disease or condition; each of the data points is collected for a sample within a patient group known to have the disease or condition of interest; each of the data points comprises (i) a total number of sequence reads (T) of the first CpG dinucleotide, and (ii) a number of methylated sequence reads (M) of the cytosine of the first CpG dinucleotide; (b) calculating, by the processor, a linear slope ($\beta$) of an M vs. T (or T vs. M) plot of the collection of data points (T, M) from the samples obtained from the patient group known to have the disease or condition (e.g., said linear slope corresponding to a line forced to extend from origin (0,0)) (e.g., by performing a linear regression fit of the collection of data points (T, M) to relate T and M by a linear dependency) wherein the linear slope is a measure of methylation proportion for the first CpG dinucleotide (e.g., said value $\beta$ having an associated standard error $\sigma$); and (c) determining, by the processor, whether the first CpG dinucleotide is a methylation biomarker informative of a classification of the presence and/or absence of the disease or condition based at least in part on said methylation proportion ($\beta_p$)

In certain embodiments, when the slope ($\beta_p$) is higher than a predetermined value of a corresponding slope ($\beta_c$) for a control group, the first CpG dinucleotide is determined to be a methylation biomarker. In certain embodiments, the control group is a group of subjects known to have a particular disease or condition and the first CpG dinucleotide may be determined to be a methylation biomarker using a cut-off set according to said control group known to have the particular disease or condition.

In certain embodiments, $\beta_c$ is a linear slope of an M vs. T (or T vs. M) plot of a collection of data points (T, M) for the first CpG dinucleotide from the samples obtained from the control group).

In certain embodiments, the step of calculating the linear slope ($\beta_p$) comprises: performing, for a first cross-plot, a linear regression to identify a line having a slope ($\beta_p$) and an intercept, and a standard error ($\sigma_p$).

In certain embodiments, the method further comprises: calculating, by the processor, an angle ($\theta$) between a horizontal line extending from data point ($\sigma_c$, $\beta_c$) in a second cross-plot and a directional vector connecting the data point ($\sigma_c$, $\beta_c$) with data point ($\sigma_p$, $\beta_p$) [e.g., corresponding to the standard error and a slope for the samples obtained from the patient group known to have the disease or condition, e.g., a "pathological" data point], wherein the data point ($\sigma_c$, $\beta_c$) corresponds to a standard error and a slope of an M vs. T (or T vs. M) plot of a collection of data points (T, M) for the first CpG dinucleotide from samples obtained from a control group of subjects (e.g., a group known not to have the disease or condition) [e.g., in certain embodiments, the "pathological" data point is the starting point (e.g., the control group) for both the directional vector and the horizontal line, e.g., in the case of hypomethylation], and wherein step (c) comprises determining, by the processor, whether the first CpG dinucleotide is a methylation biomarker informative of a classification of the disease or condition based at least in part on said slope ($\beta_p$) and said angle ($\theta$). In certain embodiments, step (c) comprises determining whether the angle ($\theta$) is higher than a predetermined value. In certain embodiments, the method further comprises calculating a magnitude which is a distance of the directional vector in the second cross-plot.

In certain embodiments, the intercept of the linear regression line is fixed at origin (0,0).

In certain embodiments, the method further comprises displaying, by the processor, one or more members selected from the group consisting of the methylation proportion ($\beta_p$), the angle ($\theta$), the magnitude, and the standard error ($\sigma_p$), a mean value of M, a minimum value of M, a maximum value of M, a mean value of T, a minimum value of T, and a maximum value of T of the first CpG dinucleotide.

In certain embodiments, the disease or condition comprises a member selected from the group consisting of advanced adenoma (AA), advanced adenoma with high grade dysplasia (HGD), colorectal cancer stage 1 (CRC 1), colorectal cancer stage 2 (CRC 2), colorectal cancer stage 3 (CRC 3), and colorectal cancer stage 4 (CRC 4).

In certain embodiments, the sequencing is or comprises bisulfite sequencing, enzymatic methylation sequencing or a methylation array.

In certain embodiments, the method further comprises: performing steps (a)-(c) for each of a plurality of additional CpG dinucleotides in the genome to determine which of the plurality are informative of the presence and/or absence of a disease or condition in a subject, thereby identifying a plurality of differentially methylated cytosines (DMCs) that are informative of the presence and/or absence of the disease or condition In certain embodiments, the plurality of additional CpG dinucleotides total at least 25,000 (e.g., at least 50,000, at least 100,000, at least 250,000, at least 500,000, at least 600,000, at least 700,000, at least 800,000, at least 900,000, or at least 1,000,000 or more, e.g., wherein the plurality of additional CpG dinucleotides total from about 25,000 to about 10,000,000, e.g., from about 50,000 to about 2,000, 000). In certain embodiments, the method further comprises identifying at least one differently methylated region (DMR) each comprising one or more of the DMCs. In certain embodiments, the method comprises identifying at least 25 DMRs (e.g., at least 50, at least 75, at least 100, at least 150, at least 200, at least 250, or at least 300; e.g., from 25 to 10,000 DMRs, e.g., from 50 to 2000 DMRs).

In another aspect, the invention is directed to a method of determining a normality status of a DNA sample (e.g., cell free DNA), said method comprising: treating the DNA sample (e.g., via bisulfite treatment or enzymatic treatment) to distinguish methylated and unmethylated CpG cytosines; and sequencing the treated DNA sample, thereby identifying a methylation status of one or more differentially methylated cytosines (DMCs) and/or one or more differentially methylated regions (DMRs), wherein the one or DMCs and/or the one or more DMRs were identified using the methods as described herein.

In another aspect, the invention is directed to a system for identifying a methylation biomarker (e.g., a CpG dinucleotide) that is informative of the presence and/or absence of a disease or condition in a subject, the system comprising: a processor; and a memory having instructions stored thereon, wherein the instructions, when executed by the processor, cause the processor to: (a) access a collection of data points (T, M) from samples, wherein: the collection of data points is obtained from sequencing reads of DNA (e.g., cell-free DNA) following treatment (e.g., bisulfite treatment or enzymatic treatment) to distinguish methylated and unmethylated CpG cytosines, said sequencing reads including reads of a first CpG dinucleotide, wherein the first CpG dinucleotide is identified according to reference genome and at a specific known genomic position in the DNA and is being evaluated to determine whether it is a methylation biomarker that is informative of the presence and/or absence of the disease or condition; each of the data points is collected for a sample within a patient group known to have the disease or condition of interest; each of the data points comprises (i) a total number of sequence reads (T) of the first CpG dinucleotide, and (ii) a number of methylated sequence reads (M) of the cytosine of the first CpG dinucleotide; (b) calculate a linear slope ($\beta$) of an M vs. T (or T vs. M) plot of the collection of data points (T, M) from the samples obtained from the patient group known to have the disease or condition, (e.g., said linear slope corresponding to a line forced to extend from origin (0,0)) (e.g., by performing a linear regression fit of the collection of data points (T, M) to relate T and M by a linear dependency) wherein the linear slope is a measure of methylation proportion for the first CpG dinucleotide (e.g., said value $\beta$ having an associated standard error $\sigma$); and (c) determine whether the first CpG dinucleotide is a methylation biomarker informative of a classification of the presence and/or absence of the disease or condition based at least in part on said methylation proportion ($\beta_p$) (e.g., wherein, when the slope ($\beta_p$) is higher than a predetermined value of a corresponding slope ($\beta_c$) for a control group (e.g., a group of subjects known not to have the disease or condition), the first CpG dinucleotide is determined to be a methylation biomarker)(e.g., and in certain embodiments, the control group is a group of subjects known to have a particular disease or condition and the first CpG dinucleotide may be determined to be a methylation biomarker using a cut-off set according to said control group known to have the particular disease or condition, e.g., for hypomethylated CpGs) (e.g., wherein $\beta_c$ is a linear slope of an M vs. T (or T vs. M) plot of a collection of data points (T, M) for the first CpG dinucleotide from the samples obtained from the control group) (e.g., said linear slope corresponding to a line forced to extend from origin (0,0)).

In certain embodiments, the instructions, when executed by the processor, cause the processor to calculating the linear slope ($\beta_p$) by: performing, for a first cross-plot, a linear regression to identify a line having a slope ($\beta_p$) and an intercept, and a standard error ($\sigma_p$). In certain embodiments, the intercept of the linear regression line is fixed at origin (0,0). In certain embodiments the instructions, when executed by the processor, further cause the processor to: calculate, by the processor, an angle ($\theta$) between a horizontal line extending from data point ($\sigma_c$, $\beta_c$) in a second cross-plot and a directional vector connecting the data point ($\sigma_c$, $\beta_c$) with data point ($\sigma_p$, $\beta_p$) [corresponding to the standard error and the slope for the samples obtained from the patient group known to have the disease or condition, e.g., a "pathological" data point], wherein the data point ($\sigma_c$, $\beta_c$) corresponds to a standard error and a slope of an M vs. T (or T vs. M) plot of a collection of data points (T, M) for the first CpG dinucleotide from samples obtained from a control group of subjects (e.g., a group of subjects known not to have the disease or condition) [e.g., in certain embodiments, the "pathological" data point is the starting point (e.g., the control group) for both the directional vector and the horizontal line, e.g., in the case of hypomethylation], and step (c) comprises determining, by the processor, whether the first CpG dinucleotide is a methylation biomarker informative of a classification of the disease or condition based at least in part on said slope ($\beta_p$) and said angle ($\theta$). In certain embodiments, step (c) comprises determining whether the angle ($\theta$) is higher than a predetermined value.

In certain embodiments, the instructions, when executed by the processor, further cause the processor to calculate a magnitude which is a distance of the directional vector in the second cross-plot.

In certain embodiments, the instructions, when executed by the processor, further cause the processor to display, by the processor, one or more members selected from the group consisting of the methylation proportion ($\beta_p$), the angle ($\theta$), the magnitude, and the standard error ($\sigma_p$), a mean value of M, a minimum value of M, a maximum value of M, a mean value of T, a minimum value of T, and a maximum value of T of the first CpG dinucleotide.

In certain embodiments, the disease or condition comprises a member selected from the group consisting of advanced adenoma (AA), advanced adenoma with high grade dysplasia (HGD), colorectal cancer stage 1 (CRC 1), colorectal cancer stage 2 (CRC 2), colorectal cancer stage 3 (CRC 3), and colorectal cancer stage 4 (CRC 4).

In certain embodiments, the sequencing is a bisulfate sequencing, enzymatic methylation sequencing, or methylation array.

In certain embodiments, the instructions, when executed by the processor, further cause the processor to: perform steps (a)-(c) for each of a plurality of additional CpG dinucleotides in the genome to determine which of the plurality are informative of the presence and/or absence of a disease or condition in a subject, thereby identifying a plurality of differentially methylated cytosines (DMCs) that are informative of the presence and/or absence of the disease or condition (e.g., wherein the plurality of additional CpG dinucleotides total at least 25,000, at least 50,000, at least 100,000, at least 250,000, at least 500,000, at least 600,000, at least 700,000, at least 800,000, at least 900,000, or at least 1,000,000 or more, e.g., wherein the plurality of additional CpG dinucleotides total from about 25,000 to about 10,000,000, e.g., from about 50,000 to about 2,000,000). In certain embodiments, the instructions, when executed by the processor, further cause the processor to identify at least one differently methylated region (DMR) each comprising one or more of the DMCs. In certain embodiments, the instructions, when executed by the processor, further cause the processor to identify at least 25 DMRs (e.g., at least 50, at least 75, at least 100, at least 150, at least 200, at least 250, or at least 300; e.g., from 25 to 10,000 DMRs, e.g., from 50 to 2000 DMRs).

In another aspect, the invention is directed to a system for determining a normality status of a DNA sample (e.g., cell free DNA), the system comprising: a processor; and a memory having instructions stored thereon, wherein the instructions, when executed by the processor, cause the processor to: treat the DNA sample (e.g., via bisulfite treatment or enzymatic treatment) to distinguish methylated and unmethylated CpG cytosines; and sequence the treated DNA sample, thereby identifying a methylation status of one or more differentially methylated cytosines (DMCs) and/or one or more differentially methylated regions (DMRs), wherein the one or DMCs and/or the one or more DMRs were identified using the systems described herein.

In another aspect, the invention is directed to a method of identifying a methylation biomarker (e.g., a CpG dinucleotide) that is informative of the presence and/or absence of a disease or condition in a subject, the method comprising: (a) accessing, by a processor of a computing device, a collection of data points (T, M) from samples, wherein: the collection of data points is obtained from sequencing reads of DNA (e.g., cell-free DNA) following treatment (e.g., bisulfite treatment or enzymatic treatment) to distinguish methylated and unmethylated CpG cytosines, said sequencing reads including reads of a first CpG dinucleotide, wherein the first CpG dinucleotide is identified according to reference genome and at a specific known genomic position in the DNA and is being evaluated to determine whether it is a methylation biomarker that is informative of the presence and/or absence of the disease or condition; each of the data points is collected for a sample within a patient group known to have the disease or condition of interest; each of the data points comprises (i) a total number of sequence reads (T) of the first CpG dinucleotide, and (ii) a number of methylated sequence reads (M) of the cytosine of the first CpG dinucleotide; (b) calculating a weighted proportionality constant between T and M for the collection of data points (T, M) from the samples obtained from the patient group known to have the disease or condition (e.g., by performing a linear regression fit of the collection of data points (T, M) to relate T and M by a linear dependency) wherein the proportionality constant is a measure of methylation proportion for the first CpG dinucleotide (e.g., said value $\beta$ having an associated standard error $\sigma$); and (c) determining, by the processor, whether the first CpG dinucleotide is a methylation biomarker informative of a classification of the presence and/or absence of the disease or condition based at least in part on said methylation proportion ($\beta_p$) (e.g., wherein, when the proportionality constant ($\beta_p$) is higher than a predetermined value of a corresponding proportionality constant ($\beta_c$) for a control group (e.g., a group of subjects known not to have the disease or condition), the first CpG dinucleotide is determined to be a methylation biomarker (e.g, and in certain embodiments, the control group is a group of subjects known to have a particular disease or condition and the first CpG dinucleotide may be determined to be a methylation biomarker using a cut-off set according to said control group known to have the particular disease or condition, e.g., for hypomethylated CpGs)) (e.g., wherein $\beta_c$ is a linear slope of an M vs. T (or T vs. M) plot of a collection of data points (T, M) for the first CpG dinucleotide from the samples obtained from the control group)

In another aspect, the invention is directed to a system for identifying a methylation biomarker (e.g., a CpG dinucleotide) that is informative of the presence and/or absence of a disease or condition in a subject, the system comprising: a processor; and a memory having instructions stored thereon, wherein the instructions, when executed by the processor, cause the processor to: (a) access a collection of data points (T, M) from samples, wherein: the collection of data points is obtained from sequencing reads of DNA (e.g., cell-free DNA) following treatment (e.g., bisulfite treatment or enzymatic treatment) to distinguish methylated and unmethylated CpG cytosines, said sequencing reads including reads of a first CpG dinucleotide, wherein the first CpG dinucleotide is identified according to reference genome and at a specific known genomic position in the DNA and is being evaluated to determine whether it is a methylation biomarker that is informative of the presence and/or absence of the disease or condition; each of the data points is collected for a sample within a patient group known to have the disease or condition of interest; each of the data points comprises (i) a total number of sequence reads (T) of the first CpG dinucleotide, and (ii) a number of methylated sequence reads (M) of the cytosine of the first CpG dinucleotide; (b) calculating a weighted proportionality constant between T and M for the collection of data points (T, M) from the samples obtained from the patient group known to have the disease or condition, wherein the proportionality constant is a measure of methylation proportion for the first CpG dinucleotide (e.g., said value β having an associated standard error σ); and (c) determine whether the first CpG dinucleotide is a methylation biomarker informative of a classification of the presence and/or absence of the disease or condition based at least in part on said methylation proportion ($β_p$) (e.g., wherein, when the proportionality constant ($β_p$) is higher than a predetermined value of a corresponding proportionality constant ($β_c$) for a control group (e.g., a group of subjects known not to have the disease or condition), the first CpG dinucleotide is determined to be a methylation biomarker) (e.g., and in certain embodiments, the control group is a group of subjects known to have a particular disease or condition and the first CpG dinucleotide may be determined to be a methylation biomarker using a cut-off set according to said control group known to have the particular disease or condition, e.g., for hypomethylated CpGs).

BRIEF DESCRIPTION OF THE DRAWINGS

The foregoing and other objects, aspects, features, and advantages of the present disclosure will become more apparent and better understood by referring to the following description taken in conjunction with the accompanying drawings, in which:

FIG. 5 includes distributions for advanced adenoma (AA), advanced adenoma with high grade dysplasia (HGD), and colorectal cancer stages 1-4 (CRC 1-4) compared to control.

Figure 1:
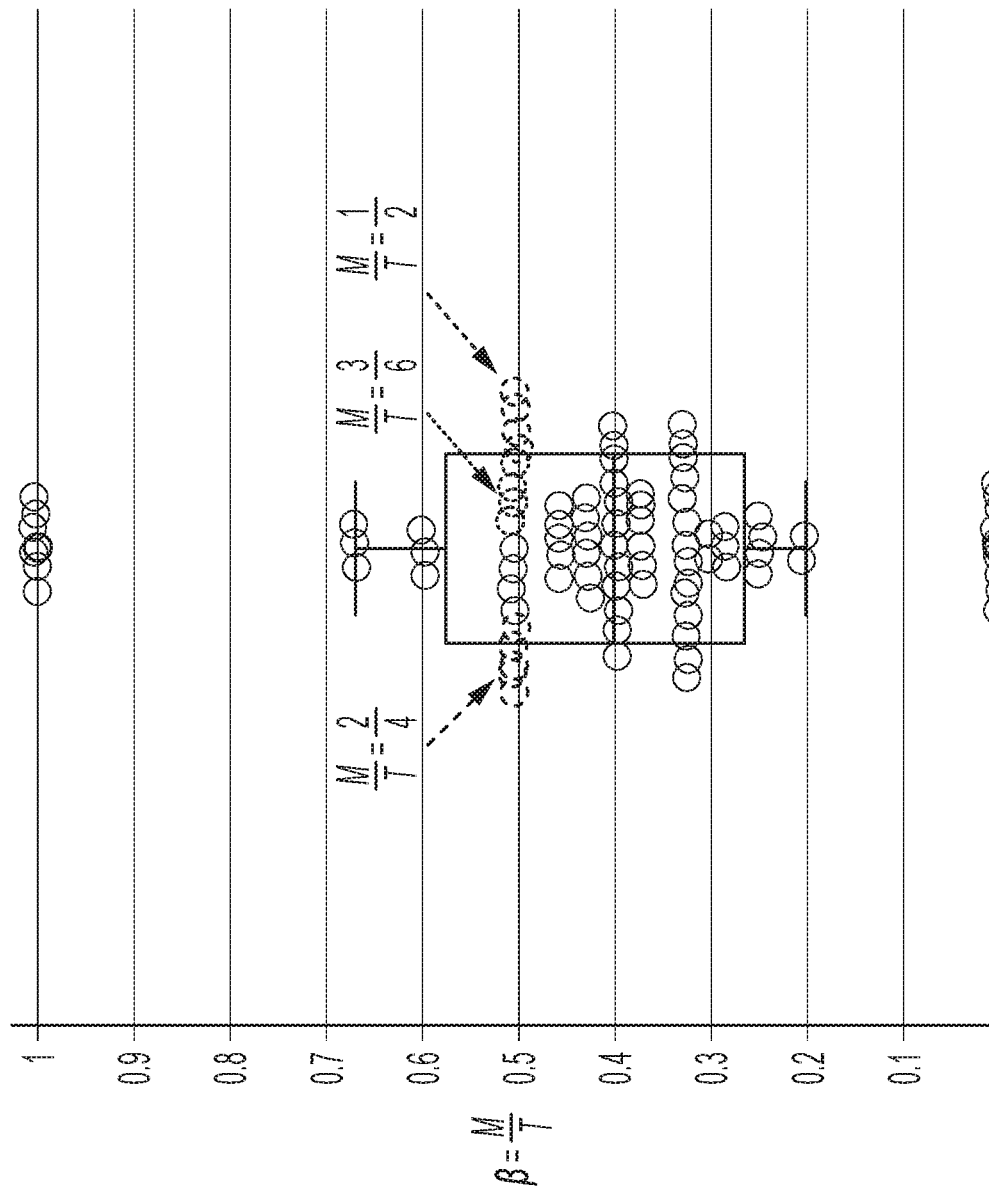
FIG. 1 is a graph showing the existing method calculating a mean ratio of the number of methylated sequence reads (M) and the total number of sequence reads (T).

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

It is contemplated that systems, devices, methods, and processes of the claimed invention encompass variations and adaptations developed using information from the embodiments described herein. Adaptation and/or modification of the systems, devices, methods, and processes described herein may be performed by those of ordinary skill in the relevant art.

Throughout the description, where articles, devices, and systems are described as having, including, or comprising specific components, or where processes and methods are described as having, including, or comprising specific steps, it is contemplated that, additionally, there are articles, devices, and systems of the present invention that consist essentially of, or consist of, the recited components, and that there are processes and methods according to the present invention that consist essentially of, or consist of, the recited processing steps.

It should be understood that the order of steps or order for performing certain actions is immaterial so long as the invention remains operable. Moreover, two or more steps or actions may be conducted simultaneously.

The mention herein of any publication, for example, in the Background section, is not an admission that the publication serves as prior art with respect to any of the claims presented herein. The Background section is presented for purposes of clarity and is not meant as a description of prior art with respect to any claim.

Headers are provided for the convenience of the reader— the presence and/or placement of a header is not intended to limit the scope of the subject matter described herein.
Differential Methylation Through Linear Model (DMLM)

DNA methylation (e.g., hypermethylation or hypomethylation) can activate or inactivate genes, including genes that impact development of different diseases, for example, cancer. Thus, for example, hypermethylation can inactivate one or more genes that typically act to suppress cancer, causing or contributing to development of cancer in a sample or subject.

The present disclosure includes the discovery that Differential Methylation through Linear Model (DMLM) can provide a numerical representation of methylation status (e.g., methylation value) for a CpG dinucleotide which is a region of DNA where a cytosine nucleotide is followed by a guanine nucleotide in the linear sequence of bases along its 5'→3' direction. In particular, the DMLM utilizes a linear regression analysis of sequencing data (e.g. bisulfate sequencing), relating a total number of sequence reads (T) (generated from addition of unmethylated reads (U) and methylated reads (M)) for a specific CpG dinucleotide genomic position, and a number of sequence reads methylated (M) at the given specific CpG dinucleotide position. Without wishing to be bound by any particular theory, the present disclosure proposes that the number of sequence reads methylated (M) is proportional to the total number of sequence reads (T) for a given CpG dinucleotide position. Additionally, such a proportionality may be consistent within the group (e.g., control group) for that CpG dinucleotide position and may have a different proportionality within another group (e.g. patient group) for the same CpG dinucleotide position, indicating the potential of the given CpG to be a potential biomarker.

FIG. 1 shows the existing approach utilizing the mean ratio between the number of methylated sequence reads (M), and the total number of sequence reads (T). The x-axis represents the total number of sequence reads (T) and the y-axis does the mean ratio (M/T) between the number of methylated sequence reads (M), and the total number of sequence reads (T). In this approach, only the ratio (M/T) matters, but the magnitude of T does not. For example, in this approach, M/T=1/2 and M/T=3/6 are the same for the mean ratio calculation, though T is different as shown in FIG. 1.

Figure 2:
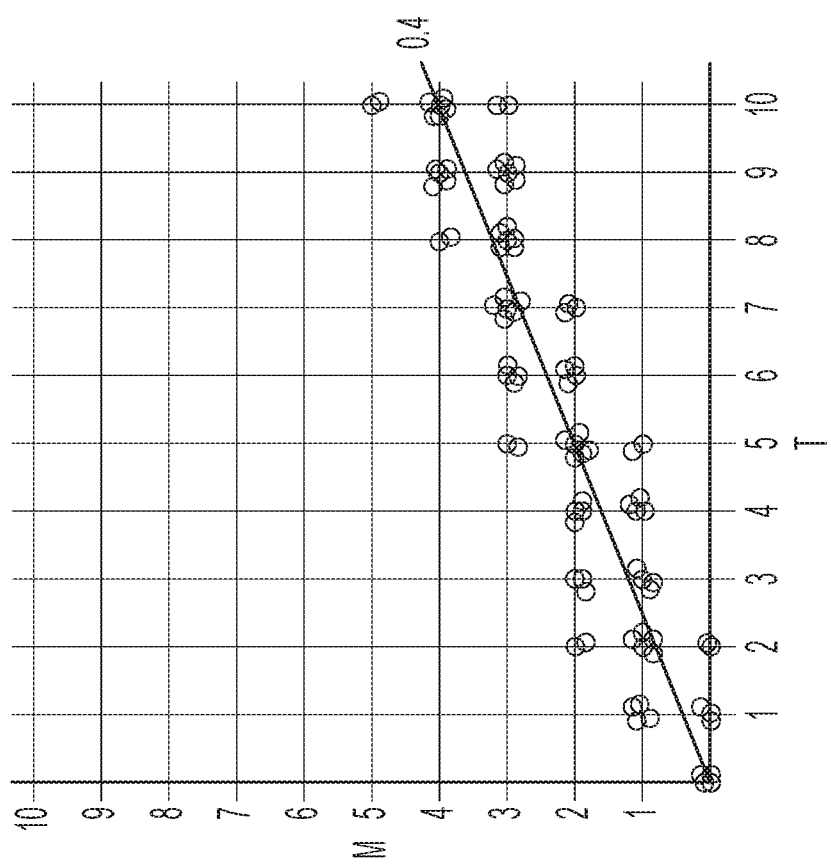
FIG. 2 is a graph showing a linear relationship between a total number of sequence reads (T) from sequencing of a given CpG dinucleotide and a number of methylated sequence reads (M) from the same sequencing of the CpG dinucleotide.

However, in the DMLM as described in the present disclosure, the two data points have different impact on the methylation proportion (i.e., the slope), as the DMLM uses the linear regression method to extract the methylation proportion. Referring to FIG. 2, a plurality of data points plotted in a T-M plot, where T is the total number of sequence reads and M is the number of methylated sequence reads at a specific CpG location from a patient in the patient group. Each of the data points may be obtained from a sample within the patient group by sequencing the selected CpG dinucleotide. In certain embodiments, the CpG dinucleotide in the particular sample may be covered by multiple sequence reads. The x-axis represents the total number of sequence reads (T) and the y-axis represents the number of methylated sequence reads (M). In certain embodiments, the relationship between a total number of sequence reads (T) from sequencing of a CpG dinucleotide and a number of methylated sequence reads (M) may be modeled. Using a linear model, the relationship can be expressed as follows:

$$M = \beta T + \beta_0 \qquad (1)$$

where $\beta$ is methylation proportion, and $\beta_0$ is an intercept of the linear model. Linear regression may be performed to obtain a slope between T and M. In certain embodiments, the slope, a methylation proportion ($\beta$), may represent a methylation status of the CpG dinucleotide. In certain embodiments, the methylation proportion ($\beta$) is calculated from linear regression by forcing the intercept to pass through the (0, 0) point of M-T (e.g., $\beta_0=0$). In certain embodiments, forcing the intercept to pass through $\beta_0=0$ alleviates the problem of having zero reads (e.g., when there are no reads present in one of the comparative groups, this ratio simply cannot be computed) on a given base. In certain embodiments, a standard error ($\sigma$) is calculated from linear regression. In certain embodiments, setting the intercept may reduce degrees of freedom. In certain embodiments, a mean, a minimum or a maximum of M and T may be useful to determine the methylation status.

Figure 3:
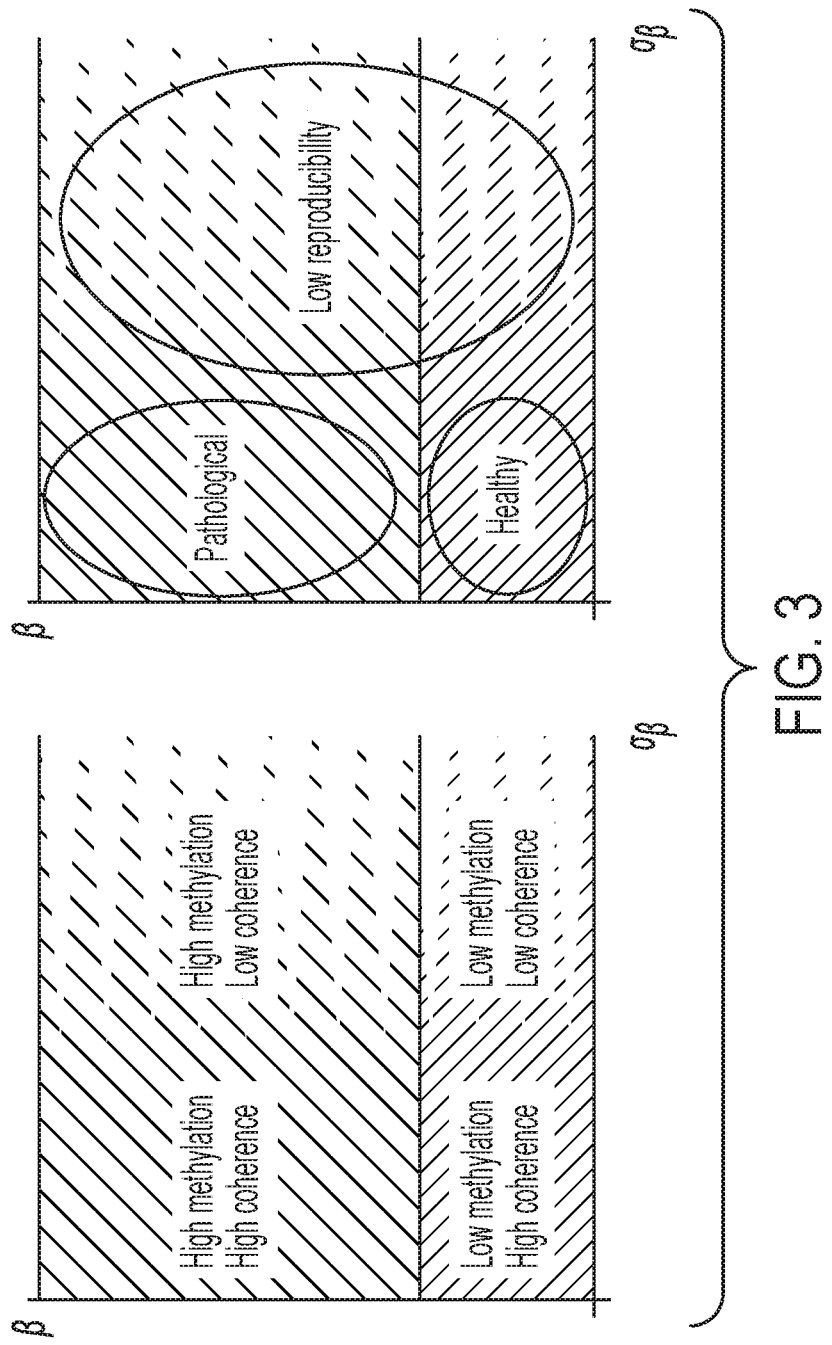
FIG. 3 shows a graphical representation of a relationship between a proportionality constant (e.g., methylation proportion) and its standard error in case of hypermethylation.

In certain embodiments, the methylation proportion ($\beta$) and its standard error ($\sigma$) may be used to provide a numerical representation of a methylation status (e.g., methylation value) between a patient group and a healthy/control group. For example, an increase in the methylation proportion ($\beta$) from the control group to the patient group indicates hypermethylation, while a decrease in the methylation proportion ($\beta$) implies hypomethylation. An increase in the standard error ($\sigma$) from the control group to the patient may demonstrate that the methylation status is gradually changing because of a disease. A decrease in the standard error ($\sigma$) may suggest that the control group has a more disordered methylation status than the patient group. FIG. 3 illustrates that data having a high methylation proportion ($\beta$) and a low standard error ($\sigma$) in pathological group and low methylation proportion ($\beta$) and low standard error ($\sigma$) in healthy/control group may be particularly useful to identify a methylation biomarker.

Figure 4:
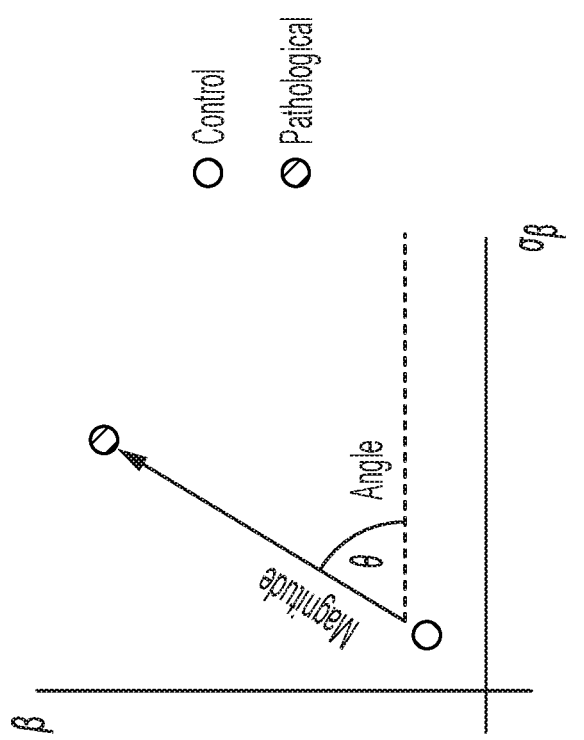
FIG. 4 depicts an angle and a magnitude between data points from a patient group and a control group, each of which represents the methylation status of the groups.

In certain embodiments, an angle ($\theta$) and a magnitude are calculated from the methylation proportion ($\beta$) and standard error ($\sigma$) of the patient group and the control group. As shown in FIG. 4, the methylation proportion ($\beta$) and standard error ($\sigma$) data points from the patient group and the control group are plotted in a graph having an x-axis of standard error ($\sigma$) and a y-axis of proportion ($\beta$). The magnitude vector is the distance between the two data points from the patient group and the control group. The vector has a direction from control to patient (pathological) group. The angle ($\theta$) is a measure of a smaller rotation formed by the magnitude vector, and the horizontal line, as indicated in FIG. 4. The angle and/or the magnitude may represent the evolution of the methylation status in a patient group of interest.

In certain embodiments, the DMLM is used to identify methylation biomarkers, which are informative of a classification of the disease or condition. In certain embodiments, the DMLM may determine whether a selected CpG dinucleotide from a patient group is differentially methylated from the selected CpG dinucleotide from a control group, and whether the change in the methylation status is significant. For example, the DMLM analyzes a collection of data points from sequencing of the selected CpG dinucleotide from a patient group. Each of the data points may be obtained by a sample from the patient group. Each of the data points may include a total number of sequence reads (T), and a number of methylated sequence reads (M). In certain embodiments, by performing a linear regression fit to relate the total number of sequence reads (T), and the number of methylated sequence reads (M) of all patients of the patient group, the methylation proportion ($\beta$) and standard error ($\sigma$) may be obtained. If the methylation proportion ($\beta_p$) of a patient group is higher than the methylation proportion ($\beta_c$) of a control group, the CpG dinucleotide exhibits hypermethylation. If the methylation proportion $\beta_p$) is lower than the methylation proportion ($\beta_c$) of the control group, the CpG dinucleotide exhibits hypomethylation. In certain embodiments, the CpG dinucleotide with hypermethylation may be a methylation biomarker. In certain embodiment, the CpG dinucleotide with hypomethylation may be a methylation biomarker.

In certain embodiments, a degree of hypermethylation or hypomethylation (e.g., methylation status difference between the patient group and the control group) may be quantified by calculating an angle ($\theta$) and a magnitude. As described above and demonstrated in FIG. 4, a vector between two data points (e.g., each of the data points includes the methylation proportion ($\beta$) and the standard error ($\sigma$)) of the patient and control groups, and a horizontal line originating from the intercept of methylation proportion ($\beta$) and the standard error ($\sigma$) of a control group, creates the angle ($\theta$). In certain embodiments, a CpG dinucleotide having an angle ($\theta$) within a predetermined range may be a methylation biomarker. In certain embodiments, a CpG dinucleotide having an angle ($\theta$) higher than a predetermined value may be a methylation biomarker. In certain embodiments, a CpG dinucleotide having an angle ($\theta$) lower than a predetermined value may be a methylation biomarker. In certain embodiments, a CpG dinucleotide having a standard error (σ) within a predetermined range may be a methylation biomarker. In certain embodiments, a CpG dinucleotide may be ordered according to their angle (θ) to create priority lists. In certain embodiments, a CpG dinucleotide may be ordered according to their (θ) and standard error (σ) to create priority lists.

In certain embodiments, the DMLM is used to identify methylation biomarkers (e.g., one or more DMRs) comprising one or more CpG dinucleotides. For example, one or more selected CpG dinucleotides from a patient group may be analyzed by the DMLM to determine whether each of the one or more selected CpG dinucleotides is differently methylated from a control group. In certain embodiments, based on angle (θ), the one or more selected CpG dinucleotides may be classified into different groups (e.g., clusters). In certain embodiments, a k-means clustering method may be used for the classification. In certain embodiments, a differently methylated region (DMR) comprising CpG dinucleotides may be defined, where the CpG dinucleotides of the DMR are close proximity CpG dinucleotides from a group or cluster having a high angle (θ). In certain embodiments, the construction of DMRs following pre-defined rules.

In certain embodiments, the DMLM is used to evaluate a methylation status for a known methylation biomarker (e.g., a CpG dinucleotide, methylation locus comprising a CpG dinucleotide, and/or a differentially methylated region comprising a plurality of (differentially methylated) CpG dinucleotides). In certain embodiments, the DMLM may determine whether a methylation biomarker from a sample is differentially methylated from the one of a control group, and whether the change in the methylation status is significant. For example, the DMLM analyzes data from sequencing of a methylation biomarker from the sample. The data may include a total number of sequence reads (T), and a number of methylated sequence reads (M). In certain embodiments, a ratio between the number of methylated sequence reads (M) and the total number of sequence reads (T) may be obtained. If the ratio of the sample is higher than the methylation proportion ($\beta_c$) of a control group, the methylation biomarker exhibits hypermethylation. If the ratio is lower than the methylation proportion ($\beta_c$) of the control group, the methylation biomarker exhibits hypomethylation. In certain embodiments, a normality status is determined by mapping the ratio on a reference scale.

Cancers

Methods and systems of the present disclosure are useful for diagnosing for cancer, e.g., colorectal cancer. Colorectal cancers include, without limitation, colon cancer, rectal cancer, and combinations thereof. Colorectal cancers include metastatic colorectal cancers and non-metastatic colorectal cancers. Colorectal cancers include cancer located in the proximal part of the colon cancer and cancer located the distal part of the colon.

Colorectal cancers include colorectal cancers at any of the various possible stages known in the art, including, e.g., Stage I, Stage II, Stage III, and Stage IV colorectal cancers (e.g., stages 0, I, IIA, IIB, IIC, IIIA, IIIB, IIIC, IVA, IVB, and IVC). Colorectal cancers include all stages of the Tumor/Node/Metastasis (TNM) staging system. With respect to colorectal cancer, T can refer to whether the tumor grew into the wall of the colon or rectum, and if so by how many layers; N can refer to whether the tumor has spread to lymph nodes, and if so how many lymph nodes and where they are located; and M can refer to whether the cancer has spread to other parts of the body, and if so which parts and to what extent. Particular stages of T, N, and M are known in the art. T stages can include TX, T0, Tis, T1, T2, T3, T4a, and T4b; N stages can include NX, N0, N1a, N1b, N1c, N2a, and N2b; M stages can include M0, M1a, and M1b. Moreover, grades of colorectal cancer can include GX, G1, G2, G3, and G4. Various means of staging cancer, and colorectal cancer in particular, are well known in the art summarized, e.g., on the world wide web at cancer.net/cancer-types/colorectal-cancer/stages.

Early stage colorectal cancers can include, e.g., colorectal cancers localized within a subject, e.g., in that they have not yet spread to lymph nodes of the subject, e.g., lymph nodes near to the cancer (stage N0), and have not spread to distant sites (stage M0). Early stage cancers include colorectal cancers corresponding to, e.g., Stages 0 to II C.

Thus, colorectal cancers of the present disclosure include, among other things, pre-malignant colorectal cancer and malignant colorectal cancer. Accordingly, the person of skill in the art will appreciate that all references to colorectal cancer provided here include, without limitation, colorectal cancer in all of its forms and stages, including without limitation those named herein or otherwise known in the art, as well as all subsets thereof.

Subjects and Samples

A sample analyzed using methods and compositions provided herein can be any biological sample and/or any sample including nucleic acid. In various particular embodiments, a sample analyzed using methods and compositions provided herein can be a sample from a mammal. In various particular embodiments, a sample analyzed using methods and compositions provided herein can be a sample from a human subject. In various particular embodiments, a sample analyzed using methods and compositions provided herein can be a sample from a mouse, rat, pig, horse, chicken, or cow.

In various instances, a human subject is a subject diagnosed or seeking diagnosis as having, diagnosed as or seeking diagnosis as at risk of having, and/or diagnosed as or seeking diagnosis as at immediate risk of having, a cancer such as a colorectal cancer. In various instances, a human subject is a subject identified as a subject in need of colorectal cancer screening. In certain instances, a human subject is a subject identified as in need of colorectal cancer screening by a medical practitioner. In various instances, a human subject is identified as in need of colorectal cancer screening due to age, e.g., due to an age equal to or greater than 50 years, e.g., an age equal to or greater than 50, 55, 60, 65, 70, 75, 80, 85, or 90 years. In various instances, a human subject is a subject not diagnosed as having, not at risk of having, not at immediate risk of having, not diagnosed as having, and/or not seeking diagnosis for a cancer such as a colorectal cancer, or any combination thereof.

A sample from a subject, e.g., a human or other mammalian subject, can be a sample of, e.g., blood, blood component, cfDNA, ctDNA, stool, or tissue. In some particular embodiments, a sample is an excretion or bodily fluid of a subject (e.g., stool, blood, lymph, or urine of a subject) or a tissue sample. A sample from a subject can be a cell or tissue sample, e.g., a cell or tissue sample that is of a cancer or includes cancer cells, e.g., of a tumor or of a metastatic tissue. In various embodiments, a sample from a subject, e.g., a human or other mammalian subject, can be obtained by biopsy (e.g., fine needle aspiration or tissue biopsy) or surgery.

In various particular embodiments, a sample is a sample of cell-free DNA (cfDNA). cfDNA is typically found in human biofluids (e.g., plasma, serum, or urine) in short, double-stranded fragments. The concentration of cfDNA is typically low, but can significantly increase under particular conditions, including without limitation pregnancy, autoimmune disorder, myocardial infraction, and cancer. Circulating tumor DNA (ctDNA) is the component of circulating DNA specifically derived from cancer cells. ctDNA can be present in human biofluids bound to leukocytes and erythrocytes or not bound to leukocytes and erythrocytes. Various tests for detection of tumor-derived cfDNA are based on detection of genetic or epigenetic modifications that are characteristic of cancer (e.g., of a relevant cancer). Genetic or epigenetic modifications characteristic of cancer can include, without limitation, oncogenic or cancer-associated mutations and/or hypermethylation in tumor-suppressor genes, mutation and/or hypomethylation lead activated oncogenes, and/or chromosomal disorders.

cfDNA and its ctDNA proportion provide a real-time or nearly real time metric of the methylation status of a source tissue. cfDNA and its ctDNA proportion demonstrate a half-life in blood of about 2 hours, such that a sample taken at a given time provides a relatively timely reflection of the status of a source tissue.

Various methods of isolating nucleic acids from a sample (e.g., of isolating cfDNA from blood or plasma) are known in the art. Nucleic acids can be isolated, e.g., without limitation, standard DNA purification techniques, by direct gene capture (e.g., by clarification of a sample to remove assay-inhibiting agents and capturing a target nucleic acid, if present, from the clarified sample with a capture agent to produce a capture complex, and isolating the capture complex to recover the target nucleic acid).

Methods of Measuring Methylation Status

Methylation status can be measured by a variety of methods known in the art and/or by methods provided herein. Those of skill in the art will appreciate that a method for measuring methylation status can generally be applied to samples from any source and of any kind, and will further be aware of processing steps available to modify a sample into a form suitable for measurement by a given methodology. Methods of measuring methylation status include, without limitation, methods including whole genome bisulfite sequencing, targeted bi sulfite sequencing, targeted enzymatic methylation sequencing, methylation-status-specific polymerase chain reaction (PCR), methods including mass spectrometry, methylation arrays, methods including methylation-specific nucleases, methods including mass-based separation, methods including target-specific capture, and methods including methylation-specific oligonucleotide primers. Certain particular assays for methylation utilize a bisulfite reagent (e.g., hydrogen sulfite ions) or enzymatic conversion reagents (e.g., Tet methylcytosine dioxygenase 2).

Bisulfite reagents can include, among other things, bisulfite, disulfite, hydrogen sulfite, or combinations thereof, which reagents can be useful in distinguishing methylated and unmethylated nucleic acids. Bisulfite interacts differently with cytosine and 5-methylcytosine. In typical bisulfite-based methods, contacting of DNA with bisulfite deaminates unmethylated cytosine to uracil, while methylated cytosine remains unaffected; methylated cytosines, but not unmethylated cytosines, are selectively retained. Thus, in a bisulfite processed sample, uracil residues stand in place of, and thus provide an identifying signal for, unmethylated cytosine residues, while remaining (methylated) cytosine residues thus provide an identifying signal for methylated cytosine residues. Bisulfite processed samples can be analyzed, e.g., by next generation sequencing (NGS).

Enzymatic conversion reagents can include Tet methylcytosine dioxygenase 2 (TET2). TET2 oxidizes 5-methylcytosine and thus protects it from the consecutive deamination by APOBEC. APOBEC deaminates unmethylated cytosine to uracil, while oxidized 5-methylcytosine remains unaffected. Thus, in a TET2 processed sample, uracil residues stand in place of, and thus provide an identifying signal for, unmethylated cytosine residues, while remaining (methylated) cytosine residues thus provide an identifying signal for methylated cytosine residues. TET2 processed samples can be analyzed, e.g., by next generation sequencing (NGS).

Various methylation assay procedures can be used in conjunction with bisulfite treatment or enzymatic treatment to determine methylation status of a target sequence such as a DMR. Such assays can include, among others, whole genome sequencing, targeted sequencing, PCR (e.g., with sequence-specific amplification), Methylation Specific Nuclease-assisted Minor-allele Enrichment PCR, and Methylation-Sensitive High Resolution Melting. In some embodiments, DMRs are amplified from a bisulfite-treated DNA sample and a DNA sequencing library is prepared for sequencing according to, e.g., an Illumina protocol or transpose-based Nextera XT protocol. In certain embodiments, high-throughput and/or next-generation sequencing techniques are used to achieve base-pair level resolution of DNA sequence, permitting analysis of methylation status.

Another method that can be used to determine methylation status after bisulfite treatment of a sample is Methylation Specific Nuclease-assisted Minor-allele Enrichment (MS-NaME) (see, e.g., Liu 2017 Nucleic Acids Res. 45(6): e39, which is herein incorporated by reference with respect to methods of determining methylation status). Ms-NaME is based on selective hybridization of probes to target sequences in the presence of DNA nuclease specific to double-stranded (ds) DNA (DSN), such that hybridization results in regions of double-stranded DNA that are subsequently digested by the DSN. Thus, oligonucleotide probes targeting unmethylated sequences generate local double stranded regions resulting to digestion of unmethylated targets; oligonucleotide probes capable of hybridizing to methylated sequences generate local double-stranded regions that result in digestion of methylated targets, leaving methylated targets intact. Moreover, oligonucleotide probes can direct DSN activity to multiple targets in bisulfite-treated DNA, simultaneously. Subsequent amplification can enrich non-digested sequences. Ms-NaME can be used, either independently or in combination with other techniques provided herein.

Methods of measuring methylation status can include, without limitation, massively parallel sequencing (e.g., next-generation sequencing) to determine methylation state, e.g., sequencing by-synthesis, real-time (e.g., single-molecule) sequencing, bead emulsion sequencing, nanopore sequencing, or other sequencing techniques known in the art. In some embodiments, a method of measuring methylation status can include whole-genome sequencing, e.g., measuring whole genome methylation status from bisulfite or enzymatically treated material with base-pair resolution.

In some embodiment, a method of measuring methylation status includes reduced representation bisulfite sequencing e.g., utilizing use of restriction enzymes to measure methylation status of high CpG content regions from bisulfite or enzymatically treated material with base-pair resolution.

In some embodiment, a method of measuring methylation status can include targeted sequencing e.g., measuring methylation status of pre-selected genomic location from bisulfite or enzymatically treated material with base-pair resolution.

In some embodiments, the pre-selection (capture) of regions of interest can be done by complementary in vitro synthesized oligonucleotide sequences (either baits, primers or probes)

In some embodiment, a method for measuring methylation status can include Illumina Methylation Assays e.g., measuring over 850,000 methylation sites quantitatively across the genome at single-nucleotide resolution.

Computer System and Network Environment

Figure 9:
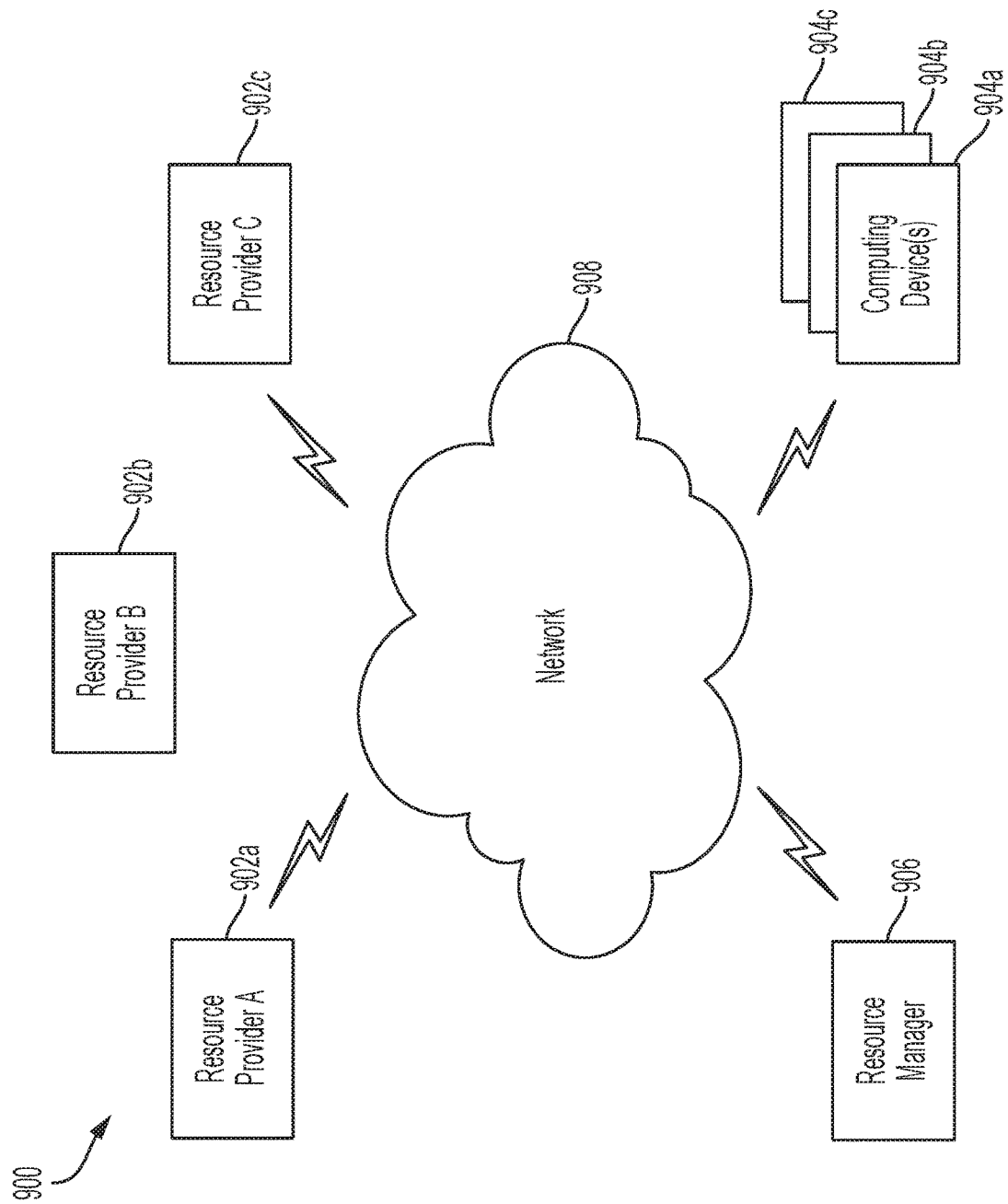
FIG. 9 is a block diagram of an exemplary cloud computing environment, used in certain embodiments.

FIG. 9 shows an illustrative network environment 900 for use in the methods and systems described herein. In brief overview, referring now to FIG. 9, a block diagram of an exemplary cloud computing environment 900 is shown and described. The cloud computing environment 900 may include one or more resource providers 902a, 902b, 902c (collectively, 902). Each resource provider 902 may include computing resources. In some implementations, computing resources may include any hardware and/or software used to process data. For example, computing resources may include hardware and/or software capable of executing algorithms, computer programs, and/or computer applications. In some implementations, exemplary computing resources may include application servers and/or databases with storage and retrieval capabilities. Each resource provider 902 may be connected to any other resource provider 902 in the cloud computing environment 900. In some implementations, the resource providers 902 may be connected over a computer network 908. Each resource provider 902 may be connected to one or more computing device 904a, 904b, 904c (collectively, 904), over the computer network 908.

The cloud computing environment 900 may include a resource manager 906. The resource manager 906 may be connected to the resource providers 902 and the computing devices 904 over the computer network 908. In some implementations, the resource manager 906 may facilitate the provision of computing resources by one or more resource providers 902 to one or more computing devices 904. The resource manager 906 may receive a request for a computing resource from a particular computing device 904. The resource manager 906 may identify one or more resource providers 902 capable of providing the computing resource requested by the computing device 904. The resource manager 906 may select a resource provider 902 to provide the computing resource. The resource manager 906 may facilitate a connection between the resource provider 902 and a particular computing device 904. In some implementations, the resource manager 906 may establish a connection between a particular resource provider 902 and a particular computing device 904. In some implementations, the resource manager 906 may redirect a particular computing device 904 to a particular resource provider 902 with the requested computing resource.

Figure 10:
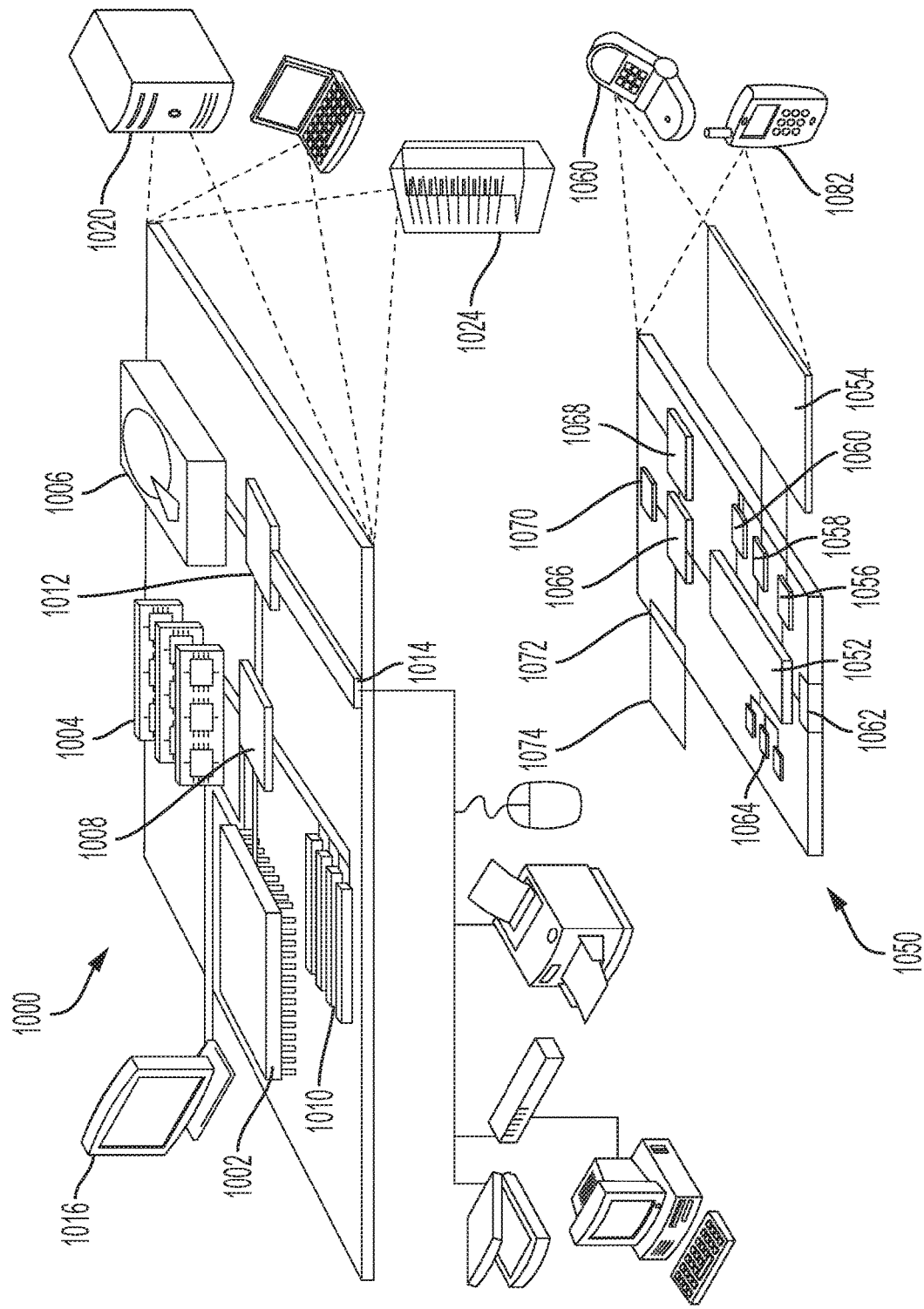
FIG. 10 is a block diagram of an example computing device and an example mobile computing device used in certain embodiments.

FIG. 10 shows an example of a computing device 1000 and a mobile computing device 1050 that can be used in the methods and systems described in this disclosure. The computing device 1000 is intended to represent various forms of digital computers, such as laptops, desktops, workstations, personal digital assistants, servers, blade servers, mainframes, and other appropriate computers. The mobile computing device 1050 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 1000 includes a processor 1002, a memory 1004, a storage device 1006, a high-speed interface 1008 connecting to the memory 1004 and multiple high-speed expansion ports 1010, and a low-speed interface 1012 connecting to a low-speed expansion port 1014 and the storage device 1006. Each of the processor 1002, the memory 1004, the storage device 1006, the high-speed interface 1008, the high-speed expansion ports 1010, and the low-speed interface 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as a display 1016 coupled to the high-speed interface 1008. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system). Thus, as the term is used herein, where a plurality of functions are described as being performed by "a processor", this encompasses embodiments wherein the plurality of functions are performed by any number of processors (one or more) of any number of computing devices (one or more). Furthermore, where a function is described as being performed by "a processor", this encompasses embodiments wherein the function is performed by any number of processors (one or more) of any number of computing devices (one or more) (e.g., in a distributed computing system).

The memory 1004 stores information within the computing device 1000. In some implementations, the memory 1004 is a volatile memory unit or units. In some implementations, the memory 1004 is a non-volatile memory unit or units. The memory 1004 may also be another form of computer-readable medium, such as a magnetic or optical disk.

The storage device 1006 is capable of providing mass storage for the computing device 1000. In some implementations, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 1002), perform one or more methods, such as those described above. The instructions can also be stored by one or more storage devices such as computer- or machine-readable mediums (for example, the memory 1004, the storage device 1006, or memory on the processor 1002).

The high-speed interface 1008 manages bandwidth-intensive operations for the computing device 1000, while the low-speed interface 1012 manages lower bandwidth-intensive operations. Such allocation of functions is an example only. In some implementations, the high-speed interface 1008 is coupled to the memory 1004, the display 1016 (e.g., through a graphics processor or accelerator), and to the high-speed expansion ports 1010, which may accept various expansion cards (not shown). In the implementation, the low-speed interface 1012 is coupled to the storage device 1006 and the low-speed expansion port 1014. The low-speed expansion port 1014, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. In addition, it may be implemented in a personal computer such as a laptop computer 1022. It may also be implemented as part of a rack server system 1024. Alternatively, components from the computing device 1000 may be combined with other components in a mobile device (not shown), such as a mobile computing device 1050. Each of such devices may contain one or more of the computing device 1000 and the mobile computing device 1050, and an entire system may be made up of multiple computing devices communicating with each other.

The mobile computing device 1050 includes a processor 1052, a memory 1064, an input/output device such as a display 1054, a communication interface 1066, and a transceiver 1068, among other components. The mobile computing device 1050 may also be provided with a storage device, such as a micro-drive or other device, to provide additional storage. Each of the processor 1052, the memory 1064, the display 1054, the communication interface 1066, and the transceiver 1068, are interconnected using various buses, and several of the components may be mounted on a common motherboard or in other manners as appropriate.

The processor 1052 can execute instructions within the mobile computing device 1050, including instructions stored in the memory 1064. The processor 1052 may be implemented as a chipset of chips that include separate and multiple analog and digital processors. The processor 1052 may provide, for example, for coordination of the other components of the mobile computing device 1050, such as control of user interfaces, applications run by the mobile computing device 1050, and wireless communication by the mobile computing device 1050.

The processor 1052 may communicate with a user through a control interface 1058 and a display interface 1056 coupled to the display 1054. The display 1054 may be, for example, a TFT (Thin-Film-Transistor Liquid Crystal Display) display or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may provide communication with the processor 1052, so as to enable near area communication of the mobile computing device 1050 with other devices. The external interface 1062 may provide, for example, for wired communication in some implementations, or for wireless communication in other implementations, and multiple interfaces may also be used.

The memory 1064 stores information within the mobile computing device 1050. The memory 1064 can be implemented as one or more of a computer-readable medium or media, a volatile memory unit or units, or a non-volatile memory unit or units. An expansion memory 1074 may also be provided and connected to the mobile computing device 1050 through an expansion interface 1072, which may include, for example, a SIMM (Single In Line Memory Module) card interface. The expansion memory 1074 may provide extra storage space for the mobile computing device 1050, or may also store applications or other information for the mobile computing device 1050. Specifically, the expansion memory 1074 may include instructions to carry out or supplement the processes described above, and may include secure information also. Thus, for example, the expansion memory 1074 may be provided as a security module for the mobile computing device 1050, and may be programmed with instructions that permit secure use of the mobile computing device 1050. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier and, when executed by one or more processing devices (for example, processor 1052), perform one or more methods, such as those described above. The instructions can also be stored by one or more storage devices, such as one or more computer- or machine-readable mediums (for example, the memory 1064, the expansion memory 1074, or memory on the processor 1052). In some implementations, the instructions can be received in a propagated signal, for example, over the transceiver 1068 or the external interface 1062.

The mobile computing device 1050 may communicate wirelessly through the communication interface 1066, which may include digital signal processing circuitry where necessary. The communication interface 1066 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 1068 using a radio-frequency. In addition, short-range communication may occur, such as using a Bluetooth®, Wi-Fi™, or other such transceiver (not shown). In addition, a GPS (Global Positioning System) receiver module 1070 may provide additional navigation- and location-related wireless data to the mobile computing device 1050, which may be used as appropriate by applications running on the mobile computing device 1050.

The mobile computing device 1050 may also communicate audibly using an audio codec 1060, which may receive spoken information from a user and convert it to usable digital information. The audio codec 1060 may likewise generate audible sound for a user, such as through a speaker, e.g., in a handset of the mobile computing device 1050. Such sound may include sound from voice telephone calls, may include recorded sound (e.g., voice messages, music files, etc.) and may also include sound generated by applications operating on the mobile computing device 1050.

The mobile computing device 1050 may be implemented in a number of different forms, as shown in the figure. For example, it may be implemented as a cellular telephone 1080. It may also be implemented as part of a smart-phone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be for a special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other. In some implementations, the modules and/or services described herein can be separated, combined or incorporated into single or combined modules and/or services. The modules and/or services depicted in the figures are not intended to limit the systems described herein to the software architectures shown therein. While the invention has been particularly shown and described with reference to specific preferred embodiments, it should be understood by those skilled in the art that various changes in form and detail may be made therein without departing from the spirit and scope of the invention as defined by the appended claims.

In certain embodiments, the computer programs comprise one or more machine learning modules. As used herein, a machine learning module refers to a computer implemented process (e.g., function) that implements one or more specific machine learning algorithms. The machine learning module may include, for example, one or more artificial neural networks. In certain embodiments, two or more machine learning modules may be combined and implemented as a single module and/or a single software application. In certain embodiments, two or more machine learning modules may also be implemented separately, e.g., as separate software applications. A machine learning module may be software and/or hardware. For example, a machine learning module may be implemented entirely as software, or certain functions of a CNN (convolutional neural network) module may be carried out via specialized hardware (e.g., via an application specific integrated circuit (ASIC)).

Examples

The present Example confirms that the present disclosure provides methods and systems for, among other things, analyzing methylation status of a CpG dinucleotide, and identifying new methylation biomarkers.

First, a state-of-art approach was applied to whole genome sequencing data generated from 52 colorectal cancerous tissues, 46 advanced adenoma tissues and 65 adjacent control tissues. For each CpG dinucleotide position in the genome, a simple ratio was calculated between methylated sequence reads (M) and total number of sequence reads (T) from each sample of the patient groups. Mean ratios of M/T were calculated for the patient group and the control group. Based on the significance of the difference (e.g., with q-value <0.05), the CpG list was further filtered to include CpGs from hypermethylated regions (e.g., regions with minimum 3 differentially methylated CpGs [DMCs] in maximum distance of 250 bp from adjacent DMC) only. There were 7698 individual DMCs.

For the DMLM approach, the whole genome bisulfite sequencing data generated over an extended group of colorectal cancer, advanced adenoma and adjacent control tissue were used. The colorectal cancer group included 81 patients including 24 stage I patients, 32 stage II patients, 21 stage III patients and, 4 stage IV patients. The advanced adenoma data were obtained from 48 patients, including 10 high grade dysplasia patients. The control tissues were acquired from 129 healthy colon tissue samples adjacent to the cancer or adenoma tissues.

The DMLM approach was then applied to (i) 7698 high-confidence DMCs found to be hypermethylated in colorectal cancer and adenoma by state-of-art ratio approach as described above for control purposes, and (ii) all of the CpG positions in the genome for identifying new/additional high-confidence DMCs.

The 7698 DMCs were analyzed to define a minimum coverage threshold (cov) and a maximum beta value ($\beta_c$) from the control samples to be used as acceptance criteria for selecting a CpG with a high confidence. 95% of the DMCs were included in this part to avoid any outliers. The thresholds (cov>3.5 and $\beta c<0.12$) were established and applied in a further clustering step.

When comparing the methylation status of two groups (e.g., control tissue group, patient group that consisted of colorectal cancer of stage I-IV and advanced adenoma of high grade dysplasia and non-high grade dysplasia tissue), the angle ($\theta$) based on standard error ($\sigma$) and methylation proportion ($\beta$) was calculated for each group.

Figure 5:
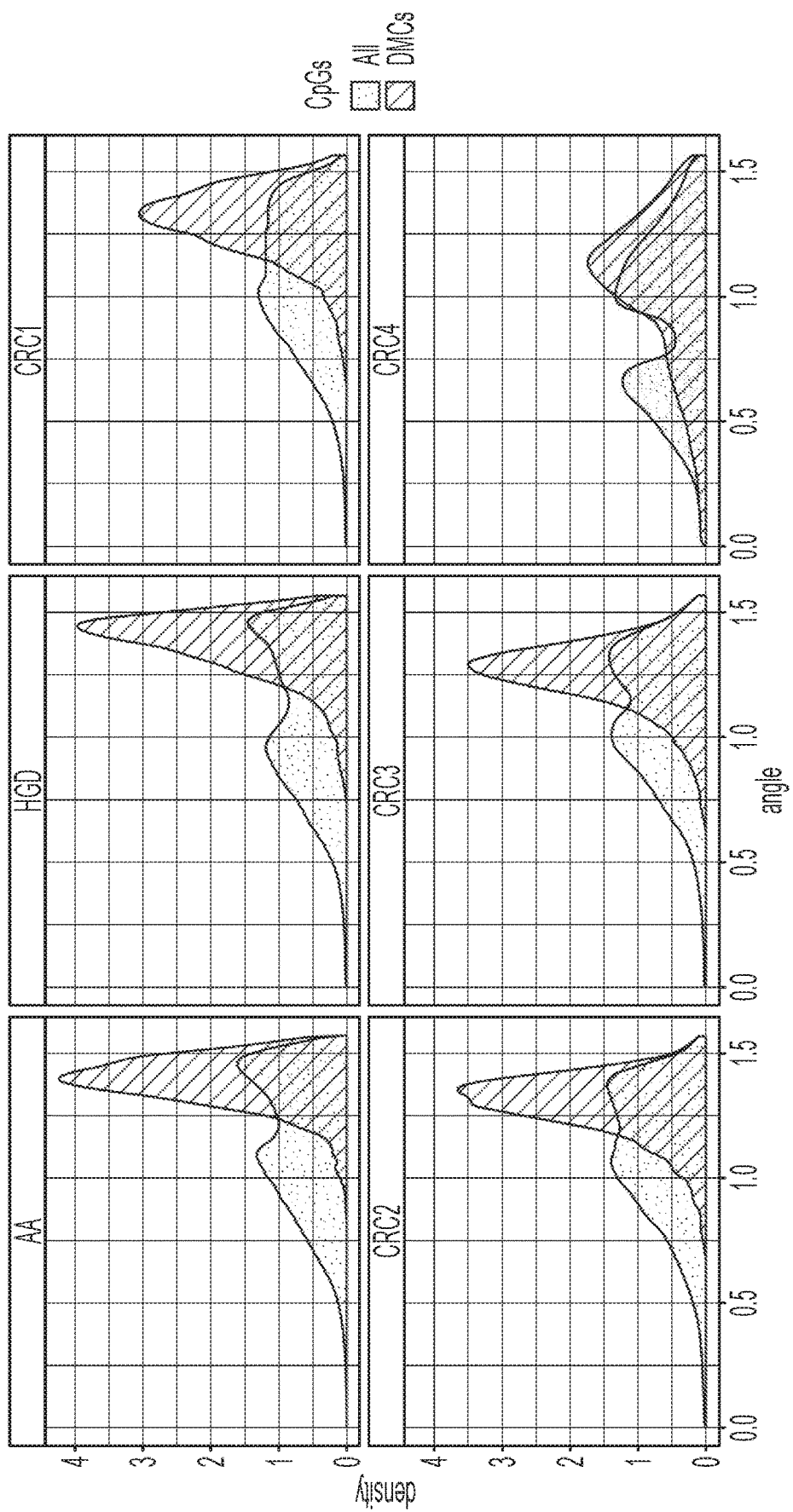
FIG. 5 shows distributions of angles from CpG dinucleotides for each pathological group in comparison to control group.

The angles ($\theta$) of CpGs both for pre-selected DMCs and for all CpGs in the WGBS data were evaluated on a density plot. FIG. 5 presents these results, where the x-axis on FIG. 5 is angle (θ), and the y-axis is density of CpGs presenting given angle in the pre-selected DMC group (DMCs) and over all CpGs of the genome (all). As shown in FIG. 5, the angles of CpG dinucleotides WGBS data from tumorous and control tissues (all) formed a bimodal distribution. The right shifted peaks of the distributions (e.g., angle ~1.4) indicates that the CpG dinucleotides of the patient group have the increased methylation proportion with relatively low standard error compared to the control group. The left shifted peaks (e.g., angle ~1) of the distributions show that the increases of the methylation proportions are not significant or that the standard error is high. However, for the pre-selected DMCs, the vast majority of these CpGs have high angles, which shift peaks to the right (e.g., angle ~1.4). This behavior corroborates the hypothesis, that the right shifted peaks of each distribution represents CpGs with higher coherence and the left shifted peaks of each distribution represents CpGs with lower coherence. These results confirm that DMLM performs in accordance with the present disclosure.

Figure 6:
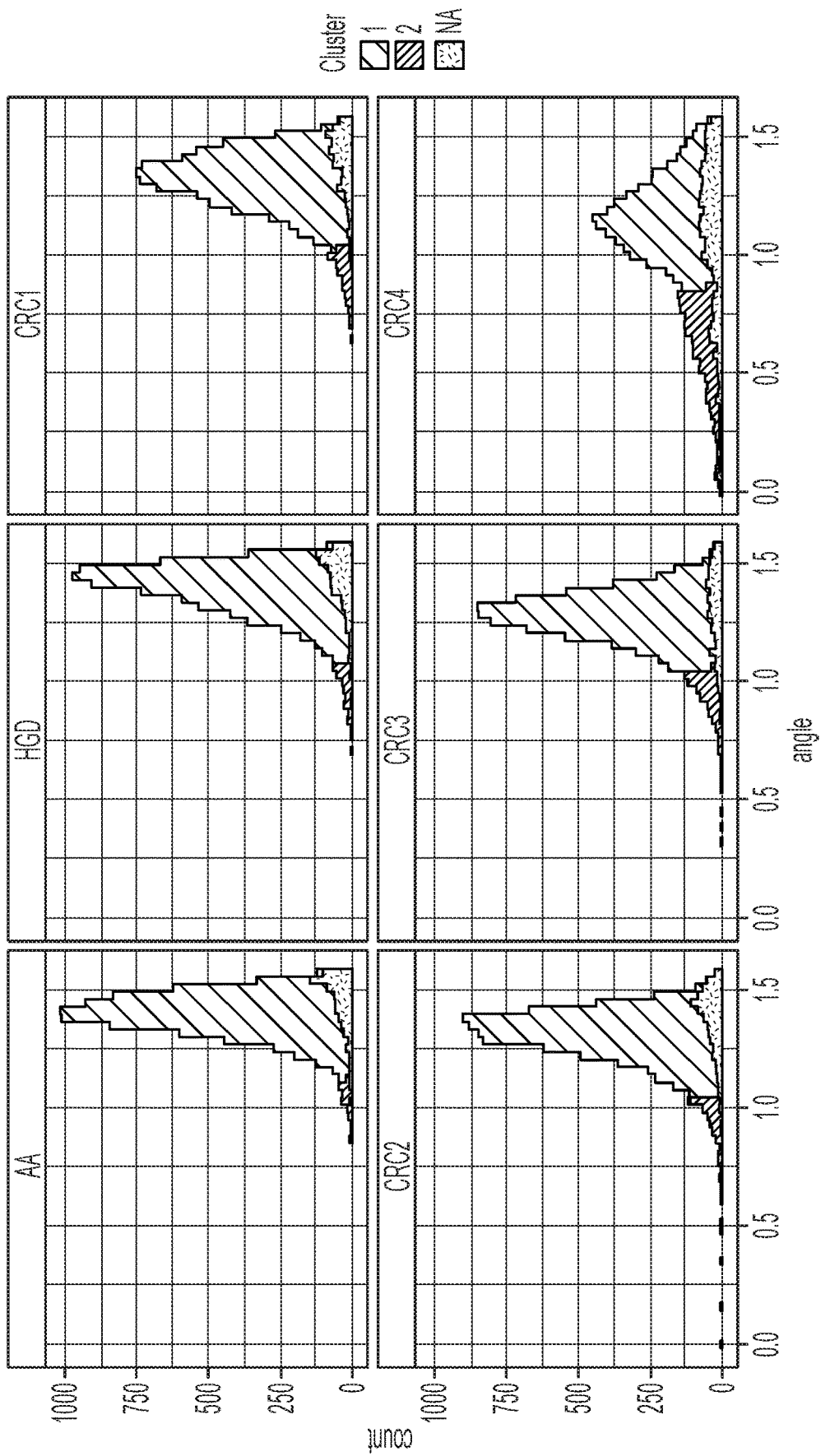
FIG. 6 is a histogram of pre-defined DMC angles per cluster for each patient group compared to control group.

Next, the pre-selected DMCs were classified into low and high confidence clusters based on their angles. Each of the graphs in FIG. 6 includes three clusters classified using a k-means clustering method. Cluster 1 contains the DMCs with high confidence, while cluster 2 contains the CpG dinucleotides with low confidence. The third (NA) cluster represents DMCs that did not fulfil the pre-set threshold of cov>3.5 and βc<0.12. Table 1 summarizes the percentage of DMCs falling to each cluster. The proportion of the DMCs in this example belonging to cluster 1 is high, because they were already pre-selected from the DMCs known in the art. This result confirms that the DMLM performs in accordance with the present disclosure.

TABLE 1 percentage of DMCs in each cluster

|  | AA | HGD | CRC1 | CRC2 | CRC3 | CRC4 |
| --- | --- | --- | --- | --- | --- | --- |
| Cluster 1 | 88% | 85% | 84% | 84% | 82% | 57% |
| Cluster 2 | 2% | 4% | 5% | 5% | 7% | 17% |
| Cluster NA | 10% | 12% | 11% | 11% | 10% | 26% |

The DMLM approach can further refine a process for identifying methylation biomarkers by (i) filtering for high confidence DMCs in cluster 1 and (ii) ordering them by the magnitude or of the angle, thereby indicating the CpGs with the highest differential methylation. Furthermore, the standard error values can be additionally used for evaluating the reproducibility/confidence of concordance of the CpG performance. Moreover, the results of cluster NA indicate CpGs that should be treated with care for further biomarker selections, as their actual relevance could be misleading. Therefore, an additional filtering option for selecting methylation markers with the highest relevance and confidence may be necessary.

Then, differentially methylated regions (DMRs) were constructed using either CpGs from cluster 1 or 2. DMRs were constructed by grouping CpGs from either cluster 1 or 2 that are within 50 bp from each other. 318 regions from cluster 1 and 22 regions from cluster 2 were identified. The regions were further sorted by the CpG mean magnitudes and deviation magnitude. The best performing regions, with high mean magnitudes and low deviations of magnitude, were selected. The best performing regions represent high and stable differential methylation across the whole region.

Figure 7:
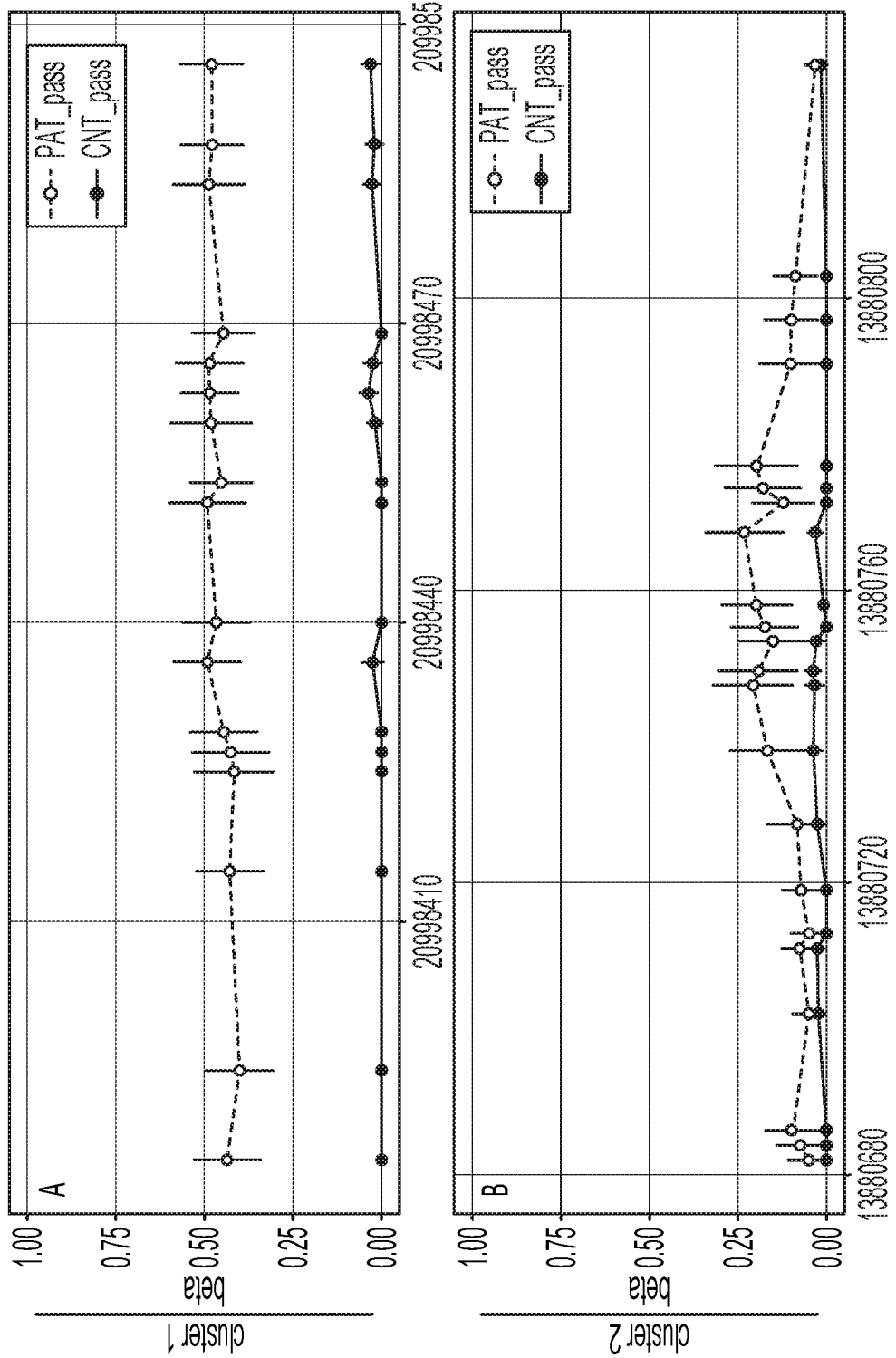
FIG. 7 includes panels A and B, displaying methylation proportions of DMR examples from advanced adenoma samples and their control tissue. Panel A of FIG. 7 depicts methylation proportions of a DMR from cluster 1. Panel B of FIG. 7 depicts methylation proportions of a DMR from cluster 2. PAT_pass indicates methylation proportions of the patient group. CNT_pass indicates methylation proportions of the control group.

The DMR from cluster 1 had higher methylation proportions than one from cluster 2. Panel A of FIG. 7 shows methylation proportions of DMCs in one of the best performing DMRs from cluster 1, selected based on the highest mean magnitude and lowest deviation of the magnitude. The methylation proportion (beta) of individual the DMCs in this DMR for the patient group are close to 0.5, while remaining close to 0 for control group. Panel B of FIG. 7 depicts pathological methylation proportions of DMCs in the best performing DMR from cluster 2. The highest methylation proportion (beta) for DMCs in this DMR from cluster 2 is about 0.25 for the patient group. The DMCs and/or DMRs with increased methylation proportion may be an important biomarker when working with more complex material, such as cell-free DNA, where DNA analyzed is a mixture of pathological and normal DNA with higher DNA proportions originating from control tissue. Small differences from pathological input in this context may be challenging to detect. In conclusion, this example shows that the DMLM can identify high confidence DMCs from raw methylation data. Such DMCs can reduce the chance for false positives.

Figure 8:
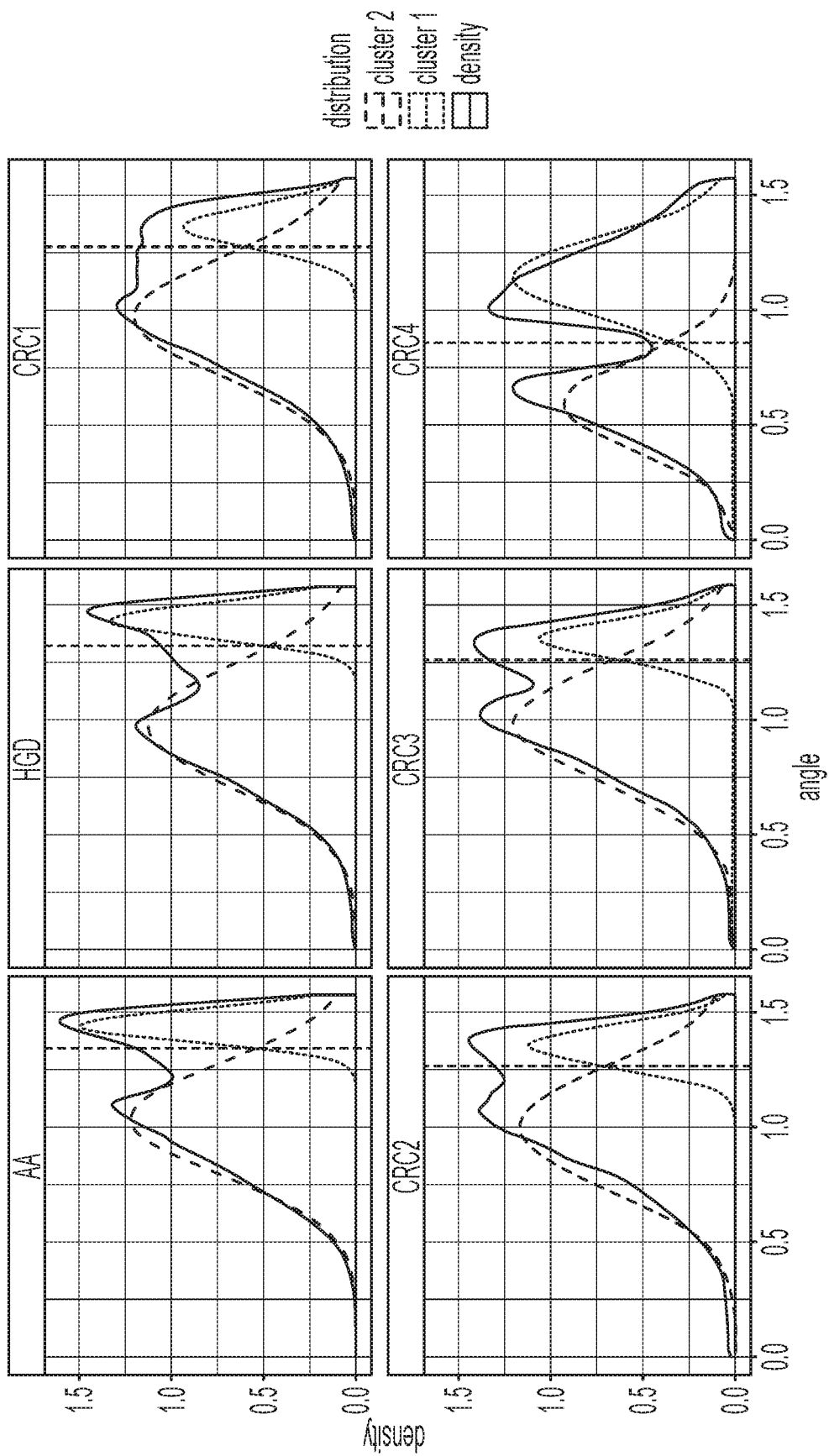
FIG. 8 is a histogram of newly identified DMC angles per cluster for each patient group compared to control group.

All CpG regions of the genome were then evaluated by the DMLM approach to find additional high confidence DMCs beyond state-of-art and construct DMRs from the tissue WGBS data. The above mentioned thresholds of cov>3.5 and βc<0.12 were applied to all of the WGBS tissue data to select CpGs for further analysis. To evaluate the DMLM approach, the data set of colorectal cancers, advanced adenomas and healthy adjacent tissue were analyzed. The colorectal cancer group included 81 patients including 24 stage I patients, 32 stage II patients, 21 stage III patients and, 4 stage IV patients. The advanced adenoma data were obtained from 48 patients including 10 high grade dysplasia patients. The control tissues were acquired from 129 healthy colon tissue samples adjacent to the cancer or adenoma tissue. Hypermethylation of pathological and control tissues were compared. Out of all 27852739 CpGs detected from the whole genome, each strata remained: AA (798094), HGD (690127), CRC1 (842570), CRC2 (799075), CRC3 (830166), CRC4 (535967). The angles of CpGs in each group form a bimodal distribution as shown in FIG. 8. Individual clusters were determined by fitting two normal distributions to the bimodal angle distribution. Cluster 1 (angle ~1.4) and cluster 2 (angle ~1) were defined by the two normal distributions. Table 2 shows all CpGs that pass a filter from WGBS analysis; pre-selected DMCs from an initial experiment; and the New DMCs identified by DMLM.

TABLE 2

Numbers of all CpGs and newly identified DMCs from either Cluster 1 or 2.

|      | All CpGs, Cluster 1 | All CpGs, Cluster 2 | pre-selected DMCs, Cluster 1 | pre-selected DMCs, Cluster 2 | New DMCs Cluster 1 | New DMCs Cluster 2 |
|------|---------|---------|------|------|--------|--------|
| AA   | 239538  | 558556  | 4891 | 2029 | 234647 | 556527 |
| HGD  | 198930  | 491197  | 4833 | 1975 | 194097 | 489222 |
| CRC1 | 220650  | 621920  | 4148 | 2737 | 216502 | 619183 |
| CRC2 | 246498  | 552577  | 4462 | 2374 | 242036 | 550203 |
| CRC3 | 249140  | 581026  | 3733 | 3167 | 245407 | 577859 |
| CRC4 | 298163  | 237803  | 4375 | 1328 | 293788 | 236475 |

Then, differentially methylated regions (DMRs) were constructed by grouping either CpGs from cluster 1 or 2 that are within 50 bp proximity of each other. Table 3 shows the numbers of regions built from All CpGs that pass the criteria in WGBS analysis, regions built from pre-selected DMCs from initial experiments and consecutive New DMRs identified by DMLM. Regions were then sorted based on CpG mean magnitudes and deviation of magnitude.

TABLE 3

Numbers of all regions and newly identified DMRs built from Cluster 1 or 2 CpGs.

|      | All regions, Cluster 1 | All regions, Cluster 2 | Pre-selected DMC regions, Cluster 1 | Pre-selected DMC regions, Cluster 2 | New DMRs Cluster 1 | New DMRs Cluster 2 |
|------|-------|-------|-----|-----|-------|-------|
| AA   | 25305 | 72462 | 360 | 193 | 24945 | 72269 |
| HGD  | 20118 | 72953 | 333 | 195 | 19785 | 72758 |
| CRC1 | 24326 | 79970 | 330 | 233 | 23996 | 79737 |
| CRC2 | 28560 | 75603 | 347 | 256 | 28213 | 75347 |
| CRC3 | 29463 | 81744 | 375 | 304 | 29088 | 81440 |
| CRC4 | 41557 | 40380 | 341 | 221 | 41216 | 40159 |

The new technique described herein provides enhanced computational efficiency as compared with prior techniques used with WGBS (e.g., the DMRSeq tool). The required computing time using prior techniques depends on the number of samples and permutations used. For example using the DMRSeq tool, if 30 samples are run (15 cases vs 15 control) with 10 permutations, then analysis would take around 5.5 hours with an 8 core computer processor; while running 430 samples (215 samples vs 215 controls) with 20 permutations takes around 10 days with the 8 core computer processor. By comparison, when using the DMLM method described herein, computing time is substantially independent of the number of samples—for example, running 30 samples (15 cases vs 15 controls) would take 3 hours with an 8 core computer processor and running 430 samples (215 cases vs 215 controls) would take approximately the same time—3 hours. Thus, many more samples can be run, saving significant computational resources and speeding analysis.

What is claimed is:

1. A method of identifying differentially methylated regions (DMRs) for use in a methylation assay for determination of the presence and/or absence of a cancer in a human subject, the method comprising:

(a) generating, by using whole genome bisulfite sequencing, sequencing reads of DNA from tissue samples obtained from patients from a patient group known to have the cancer, said reads including reads of a first CpG dinucleotide, wherein the first CpG dinucleotide is identified according to reference genome and at a specific known genomic position in the DNA, wherein the patient group known to have the cancer comprises at least 15 patients;

(b) generating, by a processor of a computing device, a collection of data points (T, M) from the sequencing reads of DNA of the tissue samples obtained from the patients from the patient group known to have the cancer, wherein each of the data points comprises (i) a total number of sequence reads (T) of the first CpG dinucleotide, and (ii) a number of methylated sequence reads (M) of the cytosine of the first CpG dinucleotide;

(c) calculating, by the processor, a linear slope ($\beta_p$) of an M vs. T (or T vs. M) plot of the collection of data points (T, M) from the samples obtained from the patient group known to have the cancer, wherein calculating the linear slope comprises performing, for a first cross-plot, a linear regression to identify a line having a slope ($\beta_p$) and an intercept, and a standard error ($\sigma_p$), wherein the intercept of the linear regression line is fixed at origin (0,0), wherein the linear slope is a measure of methylation proportion ($\beta_p$) for the first CpG dinucleotide;

(d) calculating, by the processor, an angle ($\theta$) between a horizontal line extending from data point ($\sigma_c$, $\beta_c$) in a second cross-plot and a directional vector connecting the data point ($\sigma_c$, $\beta_c$) with data point ($\sigma_p$, $\beta_p$), wherein the data point ($\sigma_c$, $\beta_c$) corresponds to a standard error and a slope of an M vs. T (or T vs. M) plot of a collection of data points (T, M) for the first CpG dinucleotide from tissue samples obtained from a control group of human subjects, wherein the control group of human subjects comprises at least 15 human subjects;

(e) determining, by the processor, whether the first CpG dinucleotide is a high confidence differentially methylated CpG dinucleotide (DMC) based at least in part on said methylation proportion ($\beta_p$) and said angle ($\theta$), (f) performing steps (b)-(e) for a plurality of additional CpG dinucleotides in the genome to identify additional high confidence DMCs, wherein the plurality of additional CpG dinucleotides total at least 25,000 CpGs;

(g) classifying, by the processor, the high confidence DMCs into a plurality of clusters based on, at least, the respective angles ($\theta$);

(h) constructing at least one DMR from one of the plurality of clusters, wherein said DMR comprises at least 3 high confidence DMCs from said cluster and wherein each of the at least 3 high confidence DMCs are within 50 base pairs of another of the at least 3 high confidence DMCs;

(i) bisulfite or enzymatically treating a sample comprising DNA obtained from a human subject having an unknown cancer status;

(j) amplifying the at least one DMR from the treated DNA sample using a pair of primers for each DMR to generate a DNA sequencing library; and (k) detecting, using a methylation assay, a methylation status of the at least one DMR from the DNA sequencing library.

2. The method of claim 1, wherein, when the slope ($\beta_p$) is higher than a predetermined value of a corresponding slope ($\beta_c$) for the control group of human subjects, the first CpG dinucleotide is determined to be a high confidence DMC.

3. The method of claim 2, wherein the first CpG dinucleotide may be determined to be a high confidence DMC using a cut-off set according to the control group.

4. The method of claim 2, wherein $\beta_c$ is a linear slope of an M vs. T (or T vs. M) plot of a collection of data points (T, M) for the first CpG dinucleotide from the tissue samples obtained from the control group.

5. The method of claim 1, wherein step (e) comprises determining whether the angle ($\theta$) is higher than a predetermined value.

6. The method of claim 1, further comprising calculating a magnitude which is a distance of the directional vector in the second cross-plot.

7. The method of claim 1, further comprising displaying, by the processor, one or more members selected from the group consisting of the methylation proportion ($\beta_p$), the angle ($\theta$), the magnitude, and the standard error ($\sigma_p$), a mean value of M, a minimum value of M, a maximum value of M, a mean value of T, a minimum value of T, and a maximum value of T of the first CpG dinucleotide.

8. The method of claim 1, wherein the cancer comprises a member selected from the group consisting of advanced adenoma (AA), advanced adenoma with high grade dysplasia (HGD), colorectal cancer stage 1 (CRC 1), colorectal cancer stage 2 (CRC 2), colorectal cancer stage 3 (CRC 3), and colorectal cancer stage 4 (CRC 4).

9. The method of claim 1, comprising identifying at least 25 DMRs.

10. The method of claim 1, wherein the control group comprises a group of human subjects known not to have the cancer.

11. The method of claim 1, wherein step (g) comprises using a k-means clustering method.

* * * * *